US012739053B2

(12) United States Patent
Kim

(10) Patent No.: US 12,739,053 B2
(45) Date of Patent: Sep. 15, 2026

(54) METHOD, COMMUNICATION DEVICE, PROCESSING DEVICE, AND STORAGE MEDIUM FOR PERFORMING CHANNEL ENCODING, AND METHOD AND COMMUNICATION DEVICE FOR PERFORMING CHANNEL DECODING

(71) Applicant: LG Electronics Inc., Seoul (KR)

(72) Inventor: Bonghoe Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 311 days.

(21) Appl. No.: 18/566,846

(22) PCT Filed: Jun. 10, 2022

(86) PCT No.: PCT/KR2022/008204
§ 371 (c)(1),
(2) Date: Dec. 4, 2023

(87) PCT Pub. No.: WO2022/260469
PCT Pub. Date: Dec. 15, 2022

(65) Prior Publication Data

US 2024/0283563 A1 Aug. 22, 2024

(30) Foreign Application Priority Data

Jun. 10, 2021 (KR) ........................ 10-2021-0075564

(51) Int. Cl.
*H04L 1/00* (2006.01)

(52) U.S. Cl.
CPC .......... *H04L 1/0013* (2013.01); *H04L 1/0057* (2013.01)

(58) Field of Classification Search
CPC ... H04L 1/0013; H04L 1/0057; H04L 1/0041; H04L 1/0068; H04L 1/1819;
(Continued)

(56) References Cited

U.S. PATENT DOCUMENTS 10,979,081 B2 4/2021 Wu et al.
2018/0026663 A1 1/2018 Wu et al.
(Continued)

FOREIGN PATENT DOCUMENTS

CA 3067966 A1 * 12/2018 ........ H03M 13/6356
KR 10-2019-0033588 3/2019
(Continued)

OTHER PUBLICATIONS

Extended European Search Report in European Appln. No. 22820596.9, mailed on Apr. 17, 2025, 11 pages.
(Continued)

*Primary Examiner* — Cheikh T Ndiaye
(74) *Attorney, Agent, or Firm* — Fish & Richardson P.C.

(57) ABSTRACT

A communication device: performs LBRM for storing, in a circular buffer having the length N_IR, N_IR coded bits from among coded bits obtained by performing encoding on the basis of a polar code; performs rate matching on coded bits stored in the circular buffer; and transmits the rate-matched coded bits to another communication device. The communication device stores, in the circular buffer, last N_IR bits from among the coded bits if a code rate is less than or equal to a predetermined value, and, if not, stores first N_IR bits in the circular buffer.

10 Claims, 15 Drawing Sheets

(58) Field of Classification Search
CPC . H04L 1/1874; H03M 13/618; H03M 13/635; H03M 13/13
See application file for complete search history.

(56) References Cited

U.S. PATENT DOCUMENTS

| | | | |
|---|---|---|---|
| 2018/0226995 A1 | 8/2018 | Wu et al. | |
| 2019/0044544 A1 | 2/2019 | Liao et al. | |
| 2019/0305887 A1* | 10/2019 | Jang | H04L 1/0061 |
| 2021/0119735 A1 | 4/2021 | Xu et al. | |

FOREIGN PATENT DOCUMENTS

| | | | |
|---|---|---|---|
| KR | 10-2020-0006051 | 1/2020 | |
| KR | 10-2020-0086682 | 7/2020 | |
| WO | WO-2017131813 A1 * | 8/2017 | H04L 1/1822 |
| WO | WO-2018029633 A1 * | 2/2018 | H03M 13/6362 |
| WO | WO-2018171652 A1 * | 9/2018 | H04W 72/542 |
| WO | WO-2018183924 A1 * | 10/2018 | H04L 1/0067 |
| WO | WO-2020034332 A1 * | 2/2020 | H04L 1/1812 |

OTHER PUBLICATIONS

Qualcomm Incorporated, "Rate-matching scheme for polar codes and performance evaluation," R1-1708647, 3GPP TSG-RAN WG1 #89, May 15-19, 2017, Hangzhou, P.R. China, 9 pages.
3GPP TS 38.212 V16.5.0 (Mar. 2021), 3rd Generation Partnership Project Technical Specification Group Radio Access Network, study on Multiplexing and channel coding(Release 16), Mar. 2021, 152 pages.
International Search Report and Written Opinion in Appln. No. PCT/KR2022/008204, mailed on Sep. 27, 2022, 8 pages (with English translation).

* cited by examiner

Figure 1:
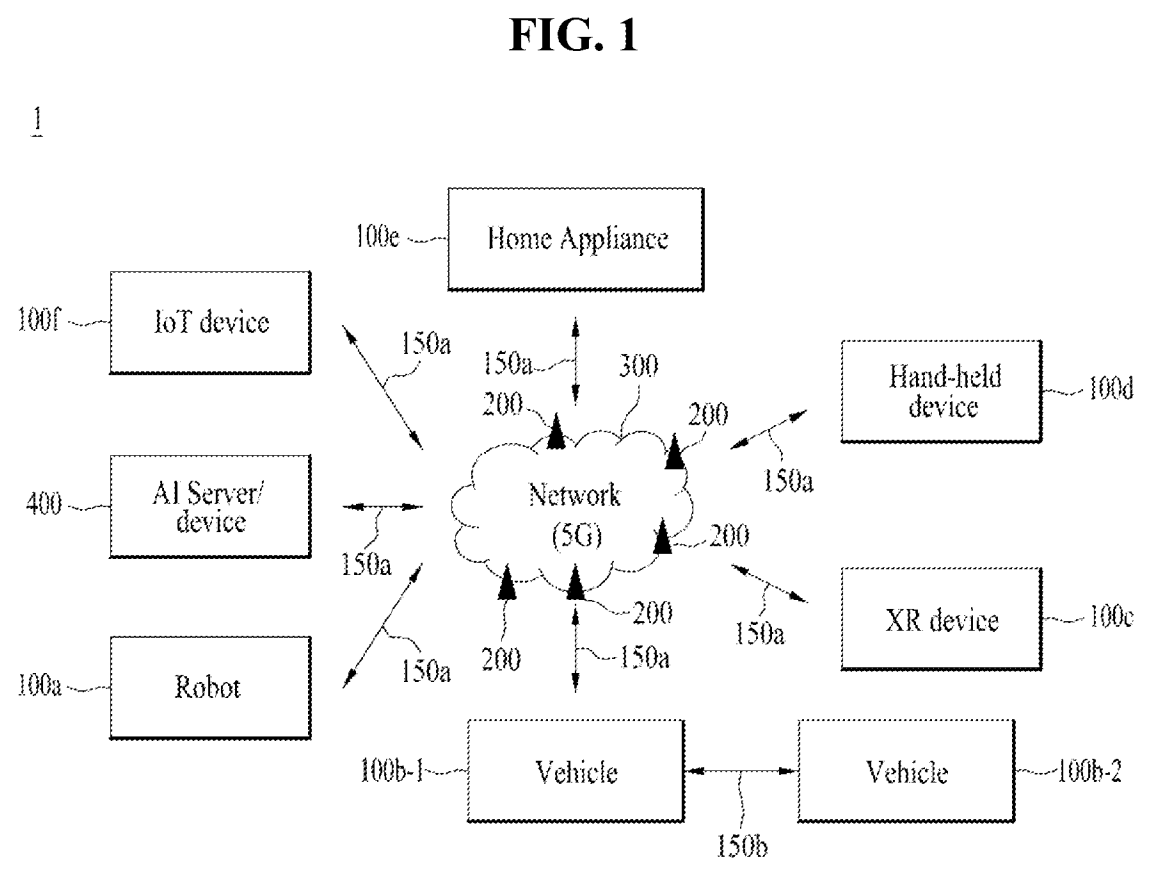

IoT device 100f

AI Server/device 400

Robot 100a

Home Appliance 100e

Network (5G) 300

200

150a

Hand-held device 100d

XR device 100c

Vehicle 100b-2

150b

Vehicle 100b-1

(a)

$$F = \begin{bmatrix} 1 & 0 \\ 1 & 1 \end{bmatrix}$$

| $C(W_i)$ | Rank | | Input | Output | Channel | Received | Codeword |
|---|---|---|---|---|---|---|---|
| 0.0039 | 8 | frozen | $u_1$ | $x_1$ | W | $y_1$ | $x_1 = \sum_{i=1}^{8} u_i$ |
| 0.1211 | 7 | frozen | $u_2$ | $x_2$ | W | $y_2$ | $x_2 = u_2 \oplus u_4 \oplus u_6 \oplus u_8$ |
| 0.1914 | 6 | frozen | $u_3$ | $x_3$ | W | $y_3$ | $x_3 = u_3 \oplus u_4 \oplus u_7 \oplus u_8$ |
| 0.6836 | 5 | data | $u_4$ | $x_4$ | W | $y_4$ | $x_4 = u_4 \oplus u_8$ |
| 0.3164 | 4 | frozen | $u_5$ | $x_5$ | W | $y_5$ | $x_5 = u_5 \oplus u_6 \oplus u_7 \oplus u_8$ |
| 0.8086 | 3 | data | $u_6$ | $x_6$ | W | $y_6$ | $x_6 = u_6 \oplus u_8$ |
| 0.8789 | 2 | data | $u_7$ | $x_7$ | W | $y_7$ | $x_7 = u_7 \oplus u_8$ |
| 0.9961 | 1 | data | $u_8$ | $x_8$ | W | $y_8$ | $x_8 = u_8$ |

METHOD, COMMUNICATION DEVICE, PROCESSING DEVICE, AND STORAGE MEDIUM FOR PERFORMING CHANNEL ENCODING, AND METHOD AND COMMUNICATION DEVICE FOR PERFORMING CHANNEL DECODING

CROSS-REFERENCE TO RELATED APPLICATIONS

This application is a National Stage application under 35 U.S.C. § 371 of International Application No. PCT/KR2022/008204, filed on Jun. 10, 2022, which claims the benefit of Korean Application No. 10-2021-0075564, filed on Jun. 10, 2021. The disclosures of the prior applications are incorporated by reference in their entirety.

TECHNICAL FIELD

The present disclosure relates to a wireless communication system.

BACKGROUND

A variety of technologies, such as machine-to-machine (M2M) communication, machine type communication (MTC), and a variety of devices demanding high data throughput, such as smartphones and tablet personal computers (PCs), have emerged and spread. Accordingly, the volume of data throughput demanded to be processed in a cellular network has rapidly increased. In order to satisfy such rapidly increasing data throughput, carrier aggregation technology or cognitive radio technology for efficiently employing more frequency bands and multiple input multiple output (MIMO) technology or multi-base station (BS) cooperation technology for raising data capacity transmitted on limited frequency resources have been developed.

As more and more communication devices have required greater communication capacity, there has been a need for enhanced mobile broadband (eMBB) communication relative to legacy radio access technology (RAT). In addition, massive machine type communication (mMTC) for providing various services at anytime and anywhere by connecting a plurality of devices and objects to each other is one main issue to be considered in next-generation communication.

Communication system design considering services/user equipment (UEs) sensitive to reliability and latency is also under discussion. The introduction of next-generation RAT is being discussed in consideration of eMBB communication, mMTC, ultra-reliable and low-latency communication (URLLC), and the like.

SUMMARY

As new radio communication technology has been introduced, the number of UEs to which a BS should provide services in a prescribed resource region is increasing and the volume of data and control information that the BS transmits/receives to/from the UEs to which the BS provides services is also increasing. Since the amount of resources available to the BS for communication with the UE(s) is limited, a new method for the BS to efficiently receive/transmit uplink/downlink data and/or uplink/downlink control information from/to the UE(s) using the limited radio resources is needed. In other words, due to increase in the density of nodes and/or the density of UEs, a method for efficiently using high-density nodes or high-density UEs for communication is needed.

A method to efficiently support various services with different requirements in a wireless communication system is also needed.

Overcoming delay or latency is an important challenge to applications, performance of which is sensitive to delay/latency.

Polar codes are proposed as an alternative to existing channel codes. Since the polar codes are used for small-sized information blocks, there is a low likelihood that codewords generated by the polar codes will exceed a buffer size. However, when the polar codes are applied to large-sized information blocks to support different services or higher reliability, there is a possibility that the codeword generated by the polar codes may exceed constraints on the buffer size. Accordingly, there is a need to define a limited buffer rate matching (LBRM) technique suitable for the polar codes.

The objects to be achieved with the present disclosure are not limited to what has been particularly described hereinabove and other objects not described herein will be more clearly understood by persons skilled in the art from the following detailed description.

In an aspect of the present disclosure, provided herein is a method of performing channel encoding by a communication device in a wireless communication system. The method may include: generating coded bits d_0, d_1, d_2, . . . , d_(N−1) by encoding an information block of length K based on a polar code of length N; performing limited buffer rate matching (LBRM) to store the coded bits d_0, d_1, d_2, . . . , d_(N−1) in a circular buffer of length $N_{IR}$, where N is greater than $N_{IR}$; performing rate matching on the coded bits stored in the circular buffer to generate a rate matching output sequence of length E; and transmitting the rate matching output sequence. Performing the LBRM may include: i) puncturing $(N-N_{IR})$ coded bits among the coded bits d_0, d_1, d 2, . . . , d (N−1) based on that K/E is smaller than or equal to R; and ii) shortening $(N-N_{IR})$ coded bits among the coded bits d_0, d_1, d_2, . . . , d_(N−1) based on that K/E is greater than R, where R is a predetermined value. Puncturing the $(N-N_{IR})$ coded bits may include excluding first $(N-N_{IR})$ coded bits among the coded bits d_0, d_1, d_2, . . . , d (N−1), and shortening the $(N-N_{IR})$ coded bits may include excluding last $(N-N_{IR})$ coded bits among the coded bits d_0, d_1, d_2, . . . , d (N−1).

In another aspect of the present disclosure, provided herein is a communication device configured to perform channel encoding in a wireless communication system. The communication device may include: at least one transceiver; at least one processor; and at least one computer memory operably connected to the at least one processor and storing instructions that, when executed, cause the at least one processor to perform operations. The operations may include: generating coded bits d_0, d_1, d_2, . . . , d_(N−1) by encoding an information block of length K based on a polar code of length N; performing limited buffer rate matching (LBRM) to store the coded bits d_0, d_1, d_2, . . . , d_(N−1) in a circular buffer of length $N_{IR}$, where N is greater than $N_{IR}$; performing rate matching on the coded bits stored in the circular buffer to generate a rate matching output sequence of length E; and transmitting the rate matching output sequence. Performing the LBRM may include: i) puncturing $(N-N_{IR})$ coded bits among the coded bits d_0, d_1, d_2, . . . , d_(N−1) based on that K/E is smaller than or equal to R; and ii) shortening $(N-N_{IR})$ coded bits among the coded bits d_0, d_1, d_2, . . . , d_(N−1) based on that K/E is greater than R, where R is a predetermined value. Puncturing the ($N-N_{IR}$) coded bits may include excluding first ($N-N_{IR}$) coded bits among the coded bits d_0, d_1, d_2, . . . , d (N−1) 1, and shortening the ($N-N_{IR}$) coded bits may include excluding last ($N-N_{IR}$) coded bits among the coded bits d_0, d_1, d_2, . . . , d (N−1).

In another aspect of the present disclosure, provided herein is a processing device in a wireless communication system. The processing device may include: at least one processor; and at least one computer memory operably connected to the at least one processor and storing instructions that, when executed, cause the at least one processor to perform operations. The operations may include: generating coded bits d_0, d_1, d_2, . . . , d_(N−1) by encoding an information block of length K based on a polar code of length N; performing limited buffer rate matching (LBRM) to store the coded bits d_0, d_1, d_2, . . . , d_(N−1) in a circular buffer of length $N_{IR}$, where N is greater than $N_{IR}$; performing rate matching on the coded bits stored in the circular buffer to generate a rate matching output sequence of length E; and transmitting the rate matching output sequence. Performing the LBRM may include: i) puncturing ($N-N_{IR}$) coded bits among the coded bits d_0, d_1, d_2, . . . , d_(N−1) based on that K/E is smaller than or equal to R; and ii) shortening ($N-N_{IR}$) coded bits among the coded bits d_0, d_1, d_2, . . . , d_(N−1) based on that K/E is greater than R, where R is a predetermined value. Puncturing the ($N-N_{IR}$) coded bits may include excluding first ($N-N_{IR}$) coded bits among the coded bits d_0, d_1, d_2, . . . , d_(N−1), and shortening the ($N-N_{IR}$) coded bits may include excluding last ($N-N_{IR}$) coded bits among the coded bits d_0, d_1, d 2, . . . , d_(N−1).

In another aspect of the present disclosure, provided herein is a computer-readable storage medium. The computer-readable storage medium may be configured to store at least one computer program including instructions that, when executed by at least one processor, cause the at least one processor to perform operations for a user equipment (UE). The operations may include: generating coded bits d_0, d_1, d_2, . . . , d_(N−1) by encoding an information block of length K based on a polar code of length N; performing limited buffer rate matching (LBRM) to store the coded bits d_0, d_1, d_2, . . . , d_(N−1) in a circular buffer of length $N_{IR}$, where N is greater than $N_{IR}$; performing rate matching on the coded bits stored in the circular buffer to generate a rate matching output sequence of length E; and transmitting the rate matching output sequence. Performing the LBRM may include: i) puncturing ($N-N_{IR}$) coded bits among the coded bits d_0, d_1, d_2, . . . , d_(N−1) based on that K/E is smaller than or equal to R; and ii) shortening ($N-N_{IR}$) coded bits among the coded bits d_0, d_1, d_2, . . . , and d_(N−1) based on that K/E is greater than R, where R is a predetermined value. Puncturing the ($N-N_{IR}$) coded bits may include excluding first ($N-N_{IR}$) coded bits among the coded bits d_0, d_1, d_2, . . . , d_(N−1), and shortening the ($N-N_{IR}$) coded bits may include excluding last ($N-N_{IR}$) coded bits among the coded bits d_0, d_1, d_2, . . . , d_(N−1).

In another aspect of the present disclosure, provided herein is a method of performing channel decoding by a communication device in a wireless communication system. The method may include: receiving a rate-matched sequence of length E from another communication device; determining $N_{IR}$ coded bits based on the rate-matched sequence, where $N_{IR}$ is a length of a circular buffer of the other communication device; determining coded bits d_0, d_1, d_2, . . . , d_(N−1) based on limited buffer rate matching (LBRM) and the $N_{IR}$ coded bits; and decoding the coded bits d_0, d_1, d_2, . . . , d_(N−1) based on a polar code of length N to determine an information block of length K. The LBRM may include: i) puncturing ($N-N_{IR}$) coded bits among the coded bits d_0, d_1, d_2, . . . , d_(N−1) based on that K/E is smaller than or equal to R; and ii) shortening ($N-N_{IR}$) coded bits among the coded bits d_0, d_1, d_2, . . . , d_(N−1) based on that K/E is greater than R, where R is a predetermined value. Puncturing the ($N-N_{IR}$) coded bits may include excluding first ($N-N_{IR}$) coded bits among the coded bits: d_0, d_1, d_2, . . . , d_(N−1), and shortening the ($N-N_{IR}$) coded bits may include excluding last ($N-N_{IR}$) coded bits among the coded bits d_0, d_1, d_2, . . . , d_(N−1).

In another aspect of the present disclosure, provided herein is a communication device configured to perform channel decoding in a wireless communication system. The communication device may include: at least one transceiver; at least one processor; and at least one computer memory operably connected to the at least one processor and storing instructions that, when executed, cause the at least one processor to perform operations. The operations may include: receiving a rate-matched sequence of length E from another communication device; determining $N_{IR}$ coded bits based on the rate-matched sequence, where $N_{IR}$ is a length of a circular buffer of the other communication device; determining coded bits d_0, d_1, d_2, . . . , d_(N−1) based on limited buffer rate matching (LBRM) and the $N_{IR}$ coded bits; and decoding the coded bits d_0, d_1, d_2, . . . , d_(N−1) based on a polar code of length N to determine an information block of length K. The LBRM may include: i) puncturing ($N-N_{IR}$) coded bits among the coded bits d_0, d_1, d_2, . . . , d_(N−1) based on that K/E is smaller than or equal to R; and ii) shortening ($N-N_{IR}$) coded bits among the coded bits d_0, d_1, d_2, . . . , d_(N−1) based on that K/E is greater than R, where R is a predetermined value. Puncturing the ($N-N_{IR}$) coded bits may include excluding first ($N-N_{IR}$) coded bits among the coded bits d_0, d_1, d_2, . . . , d_(N−1), and shortening the ($N-N_{IR}$) coded bits may include excluding last ($N-N_{IR}$) coded bits among the coded bits d_0, d_1, d_2, . . . , d_(N−1).

In another aspect of the present disclosure, provided herein is a processing device in a wireless communication system. The processing device may include: at least one processor; and at least one computer memory operably connected to the at least one processor and storing instructions that, when executed, cause the at least one processor to perform operations. The operations may include: receiving a rate-matched sequence of length E from another communication device; determining $N_{IR}$ coded bits based on the rate-matched sequence, where $N_{IR}$ is a length of a circular buffer of the other communication device; determining coded bits d_0, d_1, d_2, . . . , d_(N−1) based on limited buffer rate matching (LBRM) and the $N_{IR}$ coded bits; and decoding the coded bits d_0, d_1, d_2, . . . , d_(N−1) based on a polar code of length N to determine an information block of length K. The LBRM may include: i) puncturing ($N-N_{IR}$) coded bits among the coded bits d_0, d_1, d_2, . . . , d_(N−1) based on that K/E is smaller than or equal to R; and ii) shortening ($N-N_{IR}$) coded bits among the coded bits d_0, d_1, d_2, . . . , d_(N−1) based on that K/E is greater than R, where R is a predetermined value. Puncturing the ($N-N_{IR}$) coded bits may include excluding first ($N-N_{IR}$) coded bits among the coded bits d_0, d_1, d_2, . . . , d_(N−1), and shortening the ($N-N_{IR}$) coded bits may include excluding last ($N-N_{IR}$) coded bits among the coded bits d_0, d_1, d_2, . . . , d_(N−1).

In a further aspect of the present disclosure, provided herein is a computer-readable storage medium. The computer-readable storage medium may be configured to store at least one computer program including instructions that, when executed by at least one processor, cause the at least one processor to perform operations for a UE. The operations may include: receiving a rate-matched sequence of length E from another communication device; determining $N_{IR}$ coded bits based on the rate-matched sequence, where $N_{IR}$ is a length of a circular buffer of the other communication device; determining coded bits d_0, d_1, d_2, . . . , d_(N−1) based on limited buffer rate matching (LBRM) and the $N_{IR}$ coded bits; and decoding the coded bits d_0, d_1, d_2, . . . , d_(N−1) based on a polar code of length N to determine an information block of length K. The LBRM may include: i) puncturing $(N-N_{IR})$ coded bits among the coded bits d_0, d_1, d_2, . . . , d_(N−1) based on that K/E is smaller than or equal to R; and ii) shortening $(N-N_{IR})$ coded bits among the coded bits d_0, d_1, d_2, . . . , d_(N−1) based on that K/E is greater than R, where R is a predetermined value. Puncturing the $(N-N_{IR})$ coded bits may include excluding first $(N-N_{IR})$ coded bits among the coded bits d_0, d_1, d_2, . . . , d_(N−1), and shortening the $(N-N_{IR})$ coded bits may include excluding last $(N-N_{IR})$ coded bits among the coded bits d_0, d_1, d_2, . . . , d_(N−1).

In each aspect of the present disclosure, performing the rate matching may include performing puncturing to exclude first $(N_{IR}-E)$ coded bits among the coded bits stored in the circular buffer based on that K/E is smaller than or equal to R and that E is smaller than $N_{IR}$.

In each aspect of the present disclosure, performing the rate matching may include performing shortening to exclude last $(N_{IR}-E)$ coded bits among the coded bits stored in the circular buffer based on that K/E is greater than R and that E is smaller than $N_{IR}$.

In each aspect of the present disclosure, performing the rate matching may include cyclically repeating first $(E-N_{IR})$ coded bits among the coded bits stored in the circular buffer based on that E is greater than $N_{IR}$.

In each aspect of the present disclosure, the method or operations may include freezing bit indices corresponding to coded bits d_0 to d_$(N-N_{IR}-1)$ among the coded bits d_0, d_1, d_2, . . . , d_(N−1) among N input bit indices of the polar code, based on that K/E is smaller than or equal to R.

In each aspect of the present disclosure, the method or operations may include freezing bit indices corresponding to coded bits d_$N_{IR}$ to d_(N−1) among the coded bits d_0, d_1, d_2, . . . , d_(N−1) among N input bit indices of the polar code, based on that K/E is greater than R.

The foregoing solutions are merely a part of the examples of the present disclosure and various examples into which the technical features of the present disclosure are incorporated may be derived and understood by persons skilled in the art from the following detailed description.

According to some implementation(s) of the present disclosure, a wireless communication signal may be efficiently transmitted/received. Accordingly, the total throughput of a wireless communication system may be raised.

According to some implementation(s) of the present disclosure, various services with different requirements may be efficiently supported in a wireless communication system.

According to some implementation(s) of the present disclosure, delay/latency generated during radio communication between communication devices may be reduced.

According to some implementation(s) of the present disclosure, polar codes may be applied to data channels even when a buffer size is limited.

According to some implementation(s) of the present disclosure, polar codes may be applied even to relatively large-sized information blocks.

The effects according to the present disclosure are not limited to what has been particularly described hereinabove and other effects not described herein will be more clearly understood by persons skilled in the art related to the present disclosure from the following detailed description.

BRIEF DESCRIPTION OF THE DRAWINGS

The accompanying drawings, which are included to provide a further understanding of the present disclosure, illustrate examples of implementations of the present disclosure and together with the detailed description serve to explain implementations of the present disclosure:

FIG. 1 illustrates an example of a communication system 1 to which implementations of the present disclosure are applied;

FIG. 10 is a diagram to explain the concept of selecting position(s) to which information bit(s) are to be allocated in polar codes;

DETAILED DESCRIPTION

Figure 2:
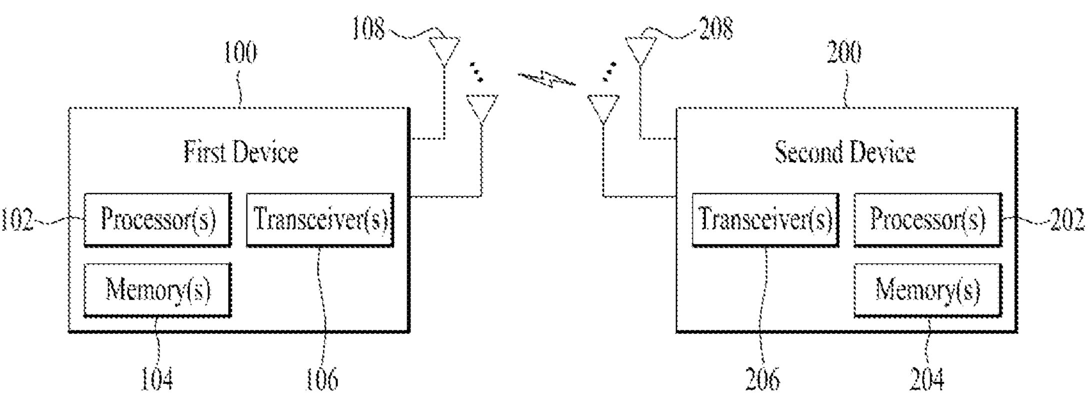
FIG. 2 is a block diagram illustrating examples of communication devices capable of performing a method according to the present disclosure.

Hereinafter, implementations according to the present disclosure will be described in detail with reference to the accompanying drawings. The detailed description, which will be given below with reference to the accompanying drawings, is intended to explain exemplary implementations of the present disclosure, rather than to show the only implementations that may be implemented according to the present disclosure. The following detailed description includes specific details in order to provide a thorough understanding of the present disclosure. However, it will be apparent to those skilled in the art that the present disclosure may be practiced without such specific details.

In some instances, known structures and devices may be omitted or may be shown in block diagram form, focusing on important features of the structures and devices, so as not to obscure the concept of the present disclosure. The same reference numbers will be used throughout the present disclosure to refer to the same or like parts.

A technique, a device, and a system described below may be applied to a variety of wireless multiple access systems. The multiple access systems may include, for example, a code division multiple access (CDMA) system, a frequency division multiple access (FDMA) system, a time division multiple access (TDMA) system, an orthogonal frequency division multiple access (OFDMA) system, a single-carrier frequency division multiple access (SC-FDMA) system, a multi-carrier frequency division multiple access (MC-FDMA) system, etc. CDMA may be implemented by radio technology such as universal terrestrial radio access (UTRA) or CDMA2000. TDMA may be implemented by radio technology such as global system for mobile communications (GSM), general packet radio service (GPRS), enhanced data rates for GSM evolution (EDGE) (i.e., GERAN), etc. OFDMA may be implemented by radio technology such as institute of electrical and electronics engineers (IEEE) 802.11 (Wi-Fi), IEEE 802.16 (WiMAX), IEEE 802.20, evolved-UTRA (E-UTRA), etc. UTRA is part of universal mobile telecommunications system (UMTS) and 3rd generation partnership project (3GPP) long-term evolution (LTE) is part of E-UMTS using E-UTRA. 3GPP LTE adopts OFDMA on downlink (DL) and adopts SC-FDMA on uplink (UL). LTE-advanced (LTE-A) is an evolved version of 3GPP LTE.

For convenience of description, description will be given under the assumption that the present disclosure is applied to LTE and/or new RAT (NR). However, the technical features of the present disclosure are not limited thereto. For example, although the following detailed description is given based on mobile communication systems corresponding to 3GPP LTE/NR systems, the mobile communication systems are applicable to other arbitrary mobile communication systems except for matters that are specific to the 3GPP LTE/NR system.

For terms and techniques that are not described in detail among terms and techniques used in the present disclosure, reference may be made to 3GPP based standard specifications, for example, 3GPP TS 36.211, 3GPP TS 36.212, 3GPP TS 36.213, 3GPP TS 36.321, 3GPP TS 36.300, 3GPP TS 36.331, 3GPP TS 37.213, 3GPP TS 38.211, 3GPP TS 38.212, 3GPP TS 38.213, 3GPP TS 38.214, 3GPP TS 38.300, 3GPP TS 38.331, etc.

In examples of the present disclosure described later, if a device "assumes" something, this may mean that a channel transmission entity transmits a channel in compliance with the corresponding "assumption." This also may mean that a channel reception entity receives or decodes the channel in the form of conforming to the "assumption" on the premise that the channel has been transmitted in compliance with the "assumption."

In the present disclosure, a user equipment (UE) may be fixed or mobile. Each of various devices that transmit and/or receive user data and/or control information by communicating with a base station (BS) may be the UE. The term UE may be referred to as terminal equipment, mobile station (MS), mobile terminal (MT), user terminal (UT), subscriber station (SS), wireless device, personal digital assistant (PDA), wireless modem, handheld device, etc. In the present disclosure, a BS refers to a fixed station that communicates with a UE and/or another BS and exchanges data and control information with a UE and another BS. The term BS may be referred to as advanced base station (ABS), Node-B (NB), evolved Node-B (eNB), base transceiver system (BTS), access point (AP), processing server (PS), etc. Particularly, a BS of a universal terrestrial radio access (UTRAN) is referred to as an NB, a BS of an evolved-UTRAN (E-UTRAN) is referred to as an eNB, and a BS of new radio access technology network is referred to as a gNB. Hereinbelow, for convenience of description, the NB, eNB, or gNB will be referred to as a BS regardless of the type or version of communication technology.

In the present disclosure, a node refers to a fixed point capable of transmitting/receiving a radio signal to/from a UE by communication with the UE. Various types of BSs may be used as nodes regardless of the names thereof. For example, a BS, NB, eNB, pico-cell eNB (PeNB), home eNB (HeNB), relay, repeater, etc. may be a node. Furthermore, a node may not be a BS. For example, a radio remote head (RRH) or a radio remote unit (RRU) may be a node. Generally, the RRH and RRU have power levels lower than that of the BS. Since the RRH or RRU (hereinafter, RRH/RRU) is connected to the BS through a dedicated line such as an optical cable in general, cooperative communication according to the RRH/RRU and the BS may be smoothly performed relative to cooperative communication according to BSs connected through a wireless link. At least one antenna is installed per node. An antenna may refer to a physical antenna port or refer to a virtual antenna or an antenna group. The node may also be called a point.

In the present disclosure, a cell refers to a specific geographical area in which one or more nodes provide communication services. Accordingly, in the present disclosure, communication with a specific cell may mean communication with a BS or a node providing communication services to the specific cell. A DL/UL signal of the specific cell refers to a DL/UL signal from/to the BS or the node providing communication services to the specific cell. A cell providing UL/DL communication services to a UE is especially called a serving cell. Furthermore, channel status/quality of the specific cell refers to channel status/quality of a channel or a communication link generated between the BS or the node providing communication services to the specific cell and the UE. In 3GPP-based communication systems, the UE may measure a DL channel state from a specific node using cell-specific reference signal(s) (CRS(s)) transmitted on a CRS resource and/or channel state information reference signal(s) (CSI-RS(s)) transmitted on a CSI-RS resource, allocated to the specific node by antenna port(s) of the specific node.

A 3GPP-based communication system uses the concept of a cell in order to manage radio resources, and a cell related with the radio resources is distinguished from a cell of a geographic area.

The "cell" of the geographic area may be understood as coverage within which a node may provide services using a carrier, and the "cell" of the radio resources is associated with bandwidth (BW), which is a frequency range configured by the carrier. Since DL coverage, which is a range within which the node is capable of transmitting a valid signal, and UL coverage, which is a range within which the node is capable of receiving the valid signal from the UE, depend upon a carrier carrying the signal, coverage of the node may also be associated with coverage of the "cell" of radio resources used by the node. Accordingly, the term "cell" may be used to indicate service coverage by the node sometimes, radio resources at other times, or a range that a signal using the radio resources may reach with valid strength at other times.

In 3GPP communication standards, the concept of the cell is used in order to manage radio resources. The "cell" associated with the radio resources is defined by a combination of DL resources and UL resources, that is, a combination of a DL component carrier (CC) and a UL CC. The cell may be configured by the DL resources only or by the combination of the DL resources and the UL resources. If carrier aggregation is supported, linkage between a carrier frequency of the DL resources (or DL CC) and a carrier frequency of the UL resources (or UL CC) may be indicated by system information. For example, the combination of the DL resources and the UL resources may be indicated by system information block type 2 (SIB2) linkage. In this case, the carrier frequency may be equal to or different from a center frequency of each cell or CC. When carrier aggregation (CA) is configured, the UE has only one radio resource control (RRC) connection with a network. During RRC connection establishment/re-establishment/handover, one serving cell provides non-access stratum (NAS) mobility information. During RRC connection re-establishment/handover, one serving cell provides security input. This cell is referred to as a primary cell (Pcell). The Pcell refers to a cell operating on a primary frequency on which the UE performs an initial connection establishment procedure or initiates a connection re-establishment procedure. According to UE capability, secondary cells (Scells) may be configured to form a set of serving cells together with the Pcell. The Scell may be configured after completion of RRC connection establishment and used to provide additional radio resources in addition to resources of a specific cell (SpCell). A carrier corresponding to the Pcell on DL is referred to as a downlink primary CC (DL PCC), and a carrier corresponding to the Pcell on UL is referred to as an uplink primary CC (UL PCC). A carrier corresponding to the Scell on DL is referred to as a downlink secondary CC (DL SCC), and a carrier corresponding to the Scell on UL is referred to as an uplink secondary CC (UL SCC).

In a dual connectivity (DC) operation, the term special cell (SpCell) refers to a Pcell of a master cell group (MCG) or a primary secondary cell (PSCell) of a secondary cell group (SCG). The SpCell supports PUCCH transmission and contention-based random access and is always activated. The MCG is a group of service cells associated with a master node (e.g., BS) and includes the SpCell (Pcell) and optionally one or more Scells. For a UE configured with DC, the SCG is a subset of serving cells associated with a secondary node and includes the PSCell and 0 or more Scells. The PSCell is a primary Scell of the SCG. For a UE in RRC_CONNECTED state, that is not configured with CA or DC, only one serving cell including only the Pcell is present. For a UE in RRC_CONNECTED state, that is configured with CA or DC, the term serving cells refers to a set of cells including SpCell(s) and all Scell(s). In DC, two medium access control (MAC) entities, i.e., one MAC entity for the MCG and one MAC entity for the SCG, are configured for the UE.

For a UE that is configured with CA and is not configured with DC, a Pcell PUCCH group including the Pcell and 0 or more Scells and an Scell PUCCH group including only Scell(s) may be configured. For the Scell, an Scell on which a PUCCH associated with the corresponding cell is transmitted (hereinafter, a PUCCH cell) may be configured. An Scell for which a PUCCH Scell is indicated belongs to the Scell PUCCH group and PUCCH transmission of related uplink control information (UCI) is performed on the PUCCH Scell. If a PUCCH Scell is not indicated for an Scell or a cell which is indicated for PUCCH transmission for the Scell is a Pcell, the Scell belongs to the Pcell PUCCH group and PUCCH transmission of related UCI is performed on the Pcell.

In a wireless communication system, the UE receives information on DL from the BS and the UE transmits information on UL to the BS. The information that the BS and UE transmit and/or receive includes data and a variety of control information and there are various physical channels according to types/usage of the information that the UE and the BS transmit and/or receive.

The 3GPP-based communication standards define DL physical channels corresponding to resource elements carrying information originating from a higher layer and DL physical signals corresponding to resource elements which are used by the physical layer but do not carry the information originating from the higher layer. For example, a physical downlink shared channel (PDSCH), a physical broadcast channel (PBCH), a physical multicast channel (PMCH), a physical control format indicator channel (PCFICH), a physical downlink control channel (PDCCH), etc. are defined as the DL physical channels, and a reference signal (RS) and a synchronization signal (SS) are defined as the DL physical signals. The RS, which is also referred to as a pilot, represents a signal with a predefined special waveform known to both the BS and the UE. For example, a demodulation reference signal (DMRS), a channel state information RS (CSI-RS), etc. are defined as DL RSs. The 3GPP-based communication standards define UL physical channels corresponding to resource elements carrying information originating from the higher layer and UL physical signals corresponding to resource elements which are used by the physical layer but do not carry the information originating from the higher layer. For example, a physical uplink shared channel (PUSCH), a physical uplink control channel (PUCCH), and a physical random access channel (PRACH) are defined as the UL physical channels, and a DMRS for a UL control/data signal, a sounding reference signal (SRS) used for UL channel measurement, etc. are defined.

In the present disclosure, a PDCCH refers to a set of time-frequency resources (e.g., resource elements (REs)) carrying downlink control information (DCI), and a PDSCH refers to a set of time-frequency resources carrying DL data. A PUCCH, a PUSCH, and a PRACH refer to a set of time-frequency resources carrying UCI, a set of time-frequency resources carrying UL data, and a set of time-frequency resources carrying random access signals, respectively. In the following description, "the UE transmits/receives a PUCCH/PUSCH/PRACH" is used as the same meaning that the UE transmits/receives the UCI/UL data/random access signals on or through the PUCCH/PUSCH/PRACH, respectively. In addition, "the BS transmits/receives a PBCH/PDCCH/PDSCH" is used as the same meaning that the BS transmits the broadcast information/DCI/DL data on or through a PBCH/PDCCH/PDSCH, respectively.

In the present disclosure, a radio resource (e.g., a time-frequency resource) scheduled or configured to the UE by the BS for transmission or reception of the PUCCH/PUSCH/PDSCH may be referred to as a PUCCH/PUSCH/PDSCH resource.

Since a communication device receives a synchronization signal block (SSB), DMRS, CSI-RS, PBCH, PDCCH, PDSCH, PUSCH, and/or PUCCH in the form of radio signals on a cell, the communication device may not select and receive radio signals including only a specific physical channel or a specific physical signal through a radio frequency (RF) receiver, or may not select and receive radio signals without a specific physical channel or a specific physical signal through the RF receiver. In actual operations, the communication device receives radio signals on the cell via the RF receiver, converts the radio signals, which are RF band signals, into baseband signals, and then decodes physical signals and/or physical channels in the baseband signals using one or more processors. Thus, in some implementations of the present disclosure, reception of physical signals and/or physical channels may mean that a communication device does not attempt to restore the physical signals and/or physical channels from radio signals, for example, does not attempt to decode the physical signals and/or physical channels, rather than that the communication device does not actually receive the radio signals including the corresponding physical signals and/or physical channels.

As more and more communication devices have required greater communication capacity, there has been a need for eMBB communication relative to legacy radio access technology (RAT). In addition, massive MTC for providing various services at anytime and anywhere by connecting a plurality of devices and objects to each other is one main issue to be considered in next-generation communication. Further, communication system design considering services/UEs sensitive to reliability and latency is also under discussion. The introduction of next-generation RAT is being discussed in consideration of eMBB communication, massive MTC, ultra-reliable and low-latency communication (URLLC), and the like. Currently, in 3GPP, a study on the next-generation mobile communication systems after EPC is being conducted. In the present disclosure, for convenience, the corresponding technology is referred to as a new RAT (NR) or fifth-generation (5G) RAT, and a system using NR or supporting NR is referred to as an NR system.

FIG. 1 illustrates an example of a communication system 1 to which implementations of the present disclosure are applied. Referring to FIG. 1, the communication system 1 applied to the present disclosure includes wireless devices, BSs, and a network. Here, the wireless devices represent devices performing communication using RAT (e.g., 5G NR or LTE (e.g., E-UTRA)) and may be referred to as communication/radio/5G devices. The wireless devices may include, without being limited to, a robot 100*a*, vehicles 100*b*-1 and 100*b*-2, an extended reality (XR) device 100*c*, a hand-held device 100*d*, a home appliance 100*e*, an Internet of Things (IoT) device 100*f*, and an artificial intelligence (AI) device/server 400. For example, the vehicles may include a vehicle having a wireless communication function, an autonomous driving vehicle, and a vehicle capable of performing vehicle-to-vehicle communication. Here, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or smartglasses), and a computer (e.g., a notebook). The home appliance may include a TV, a refrigerator, and a washing machine. The IoT device may include a sensor and a smartmeter. For example, the BSs and the network may also be implemented as wireless devices and a specific wireless device may operate as a BS/network node with respect to another wireless device.

The wireless devices 100*a* to 100*f* may be connected to a network 300 via BSs 200. AI technology may be applied to the wireless devices 100*a* to 100*f* and the wireless devices 100*a* to 100*f* may be connected to the AI server 400 via the network 300. The network 300 may be configured using a 3G network, a 4G (e.g., LTE) network, or a 5G (e.g., NR) network. Although the wireless devices 100*a* to 100*f* may communicate with each other through the BSs 200/network 300, the wireless devices 100*a* to 100*f* may perform direct communication (e.g., sidelink communication) with each other without passing through the BSs/network. For example, the vehicles 100*b*-1 and 100*b*-2 may perform direct communication (e.g., vehicle-to-vehicle (V2V)/Vehicle-to-everything (V2X) communication). The IoT device (e.g., a sensor) may perform direct communication with other IoT devices (e.g., sensors) or other wireless devices 100*a* to 100*f*.

Wireless communication/connections 150*a* and 150*b* may be established between the wireless devices 100*a* to 100*f* and the BSs 200 and between the wireless devices 100*a* to 100*f*). Here, the wireless communication/connections such as UL/DL communication 150*a* and sidelink communication 150*b* (or, device-to-device (D2D) communication) may be established by various RATs (e.g., 5G NR). The wireless devices and the BSs/wireless devices may transmit/receive radio signals to/from each other through the wireless communication/connections 150*a* and 150*b*. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

FIG. 2 is a block diagram illustrating examples of communication devices capable of performing a method according to the present disclosure. Referring to FIG. 2, a first wireless device 100 and a second wireless device 200 may transmit and/or receive radio signals through a variety of RATs (e.g., LTE and NR). Here, {the first wireless device 100 and the second wireless device 200} may correspond to {the wireless device 100*x* and the BS 200} and/or {the wireless device 100*x* and the wireless device 100*x*} of FIG. 1.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the below-described/proposed functions, procedures, and/or methods. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver(s) 106 and then store information obtained by processing the second information/signals in the memory(s) 104. The memory(s) 104 may be connected to the processor(s) 102 and may store a variety of information related to operations of the processor(s) 102. For example, the memory(s) 104 may perform a part or all of processes controlled by the processor(s) 102 or store software code including instructions for performing the below-described/proposed procedures and/or methods. Here, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 is used interchangeably with radio frequency (RF) unit(s). In the present disclosure, the wireless device may represent the communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the below-described/proposed functions, procedures, and/or methods. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may perform a part or all of processes controlled by the processor(s) 202 or store software code including instructions for performing the below-described/proposed procedures and/or methods. Here, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 is used interchangeably with RF unit(s). In the present disclosure, the wireless device may represent the communication modem/circuit/chip.

The wireless communication technology implemented in the wireless devices 100 and 200 of the present disclosure may include narrowband Internet of things for low-power communication as well as LTE, NR, and 6G. For example, the NB-IoT technology may be an example of low-power wide-area network (LPWAN) technologies and implemented in standards such as LTE Cat NB1 and/or LTE Cat NB2. However, the NB-IoT technology is not limited to the above names. Additionally or alternatively, the wireless communication technology implemented in the wireless devices XXX and YYY of the present disclosure may perform communication based on the LTE-M technology. For example, the LTE-M technology may be an example of LPWAN technologies and called by various names including enhanced machine type communication (eMTC). For example, the LTE-M technology may be implemented in at least one of the following various standards: 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M, etc., but the LTE-M technology is not limited to the above names. Additionally or alternatively, the wireless communication technology implemented in the wireless devices XXX and YYY of the present disclosure may include at least one of ZigBee, Bluetooth, and LPWAN in consideration of low-power communication, but the wireless communication technology is not limited to the above names. For example, the ZigBee technology may create a personal area network (PAN) related to small/low-power digital communication based on various standards such as IEEE 802.15.4 and so on, and the ZigBee technology may be called by various names.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as a physical (PHY) layer, medium access control (MAC) layer, a radio link control (RLC) layer, a packet data convergence protocol (PDCP) layer, radio resource control (RRC) layer, and a service data adaptation protocol (SDAP) layer). The one or more processors 102 and 202 may generate one or more protocol data units (PDUs) and/or one or more service data units (SDUs) according to the functions, procedures, proposals, and/or methods disclosed in the present disclosure. The one or more processors 102 and 202 may generate messages, control information, data, or information according to the functions, procedures, proposals, and/or methods disclosed in the present disclosure. The one or more processors 102 and 202 may generate signals (e.g., baseband signals) including PDUs, SDUs, messages, control information, data, or information according to the functions, procedures, proposals, and/or methods disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the functions, procedures, proposals, and/or methods disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The functions, procedures, proposals, and/or methods disclosed in the present disclosure may be implemented using firmware or software, and the firmware or software may be configured to include the modules, procedures, or functions. Firmware or software configured to perform the functions, procedures, proposals, and/or methods disclosed in the present disclosure may be included in the one or more processors 102 and 202 or stored in the one or more memories 104 and 204 so as to be driven by the one or more processors 102 and 202. The functions, procedures, proposals, and/or methods disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, commands, and/or instructions. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of the present disclosure, to one or more other devices. The one or more transceivers 106 and 206 may receive user data, control information, and/or radio signals/channels, mentioned in the functions, procedures, proposals, methods, and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208. The one or more transceivers 106 and 206 may be configured to transmit and receive user data, control information, and/or radio signals/channels, mentioned in the functions, procedures, proposals, methods, and/or operational flowcharts disclosed in the present disclosure, through the one or more antennas 108 and 208. In the present disclosure, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 3:
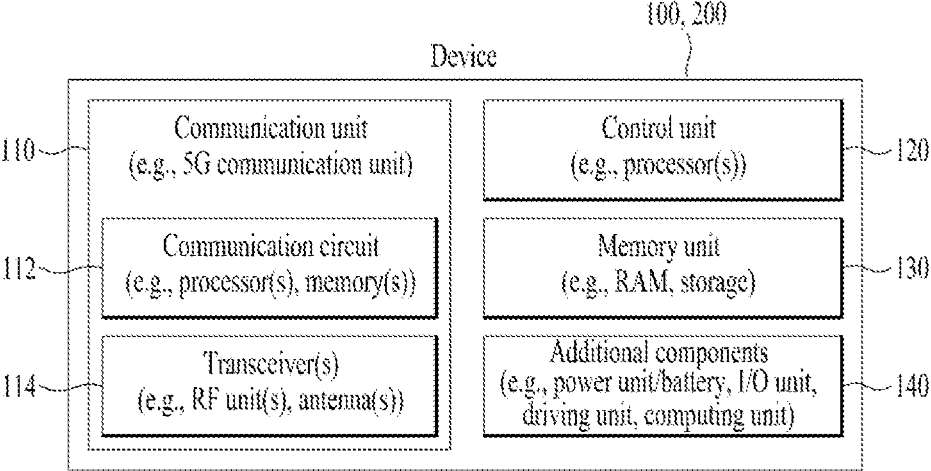
FIG. 3 illustrates another example of a wireless device capable of performing implementation(s) of the present disclosure.

FIG. 3 illustrates another example of a wireless device capable of performing implementation(s) of the present disclosure. Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 2. For example, the transceiver(s) 114 may include the one or more transceivers 106 and 206 and/or the one or more antennas 108 and 208 of FIG. 2. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. 1), the vehicles (100*b*-1 and 100*b*-2 of FIG. 1), the XR device (100*c* of FIG. 1), the hand-held device (100*d* of FIG. 1), the home appliance (100*e* of FIG. 1), the IoT device (100*f* of FIG. 1), a digital broadcast UE, a hologram device, a public safety device, an MTC device, a medicine device, a fintech device (or a finance device), a security device, a climate/environment device, the AI server/device (400 of FIG. 1), the BS (200 of FIG. 1), a network node, etc. The wireless device may be used in a mobile or fixed place according to a use-case/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an electronic control unit (ECU), a graphical processing unit, and a memory control processor. As another example, the memory 130 may be configured by a random access memory (RAM), a dynamic RAM (DRAM), a read-only memory (ROM)), a flash memory, a transitory memory, a non-transitory memory, and/or a combination thereof.

In the present disclosure, the at least one memory (e.g., 104 or 204) may store instructions or programs, and the instructions or programs may cause, when executed, at least one processor operably connected to the at least one memory to perform operations according to some embodiments or implementations of the present disclosure.

In the present disclosure, a computer readable (non-transitory) storage medium may store at least one instruction or program, and the at least one instruction or program may cause, when executed by at least one processor, the at least one processor to perform operations according to some embodiments or implementations of the present disclosure.

In the present disclosure, a processing device or apparatus may include at least one processor, and at least one computer memory operably connected to the at least one processor. The at least one computer memory may store instructions or programs, and the instructions or programs may cause, when executed, the at least one processor operably connected to the at least one memory to perform operations according to some embodiments or implementations of the present disclosure.

In the present disclosure, a computer program may include program code stored on at least one computer-readable (non-transitory) storage medium and, when executed, configured to perform operations according to some implementations of the present disclosure or cause at least one processor to perform the operations according to some implementations of the present disclosure. The computer program may be provided in the form of a computer program product. The computer program product may include at least one computer-readable (non-transitory) storage medium.

A communication device of the present disclosure includes at least one processor; and at least one computer memory operably connected to the at least one processor and configured to store instructions for causing, when executed, the at least one processor to perform operations according to example(s) of the present disclosure described later.

Figure 4:
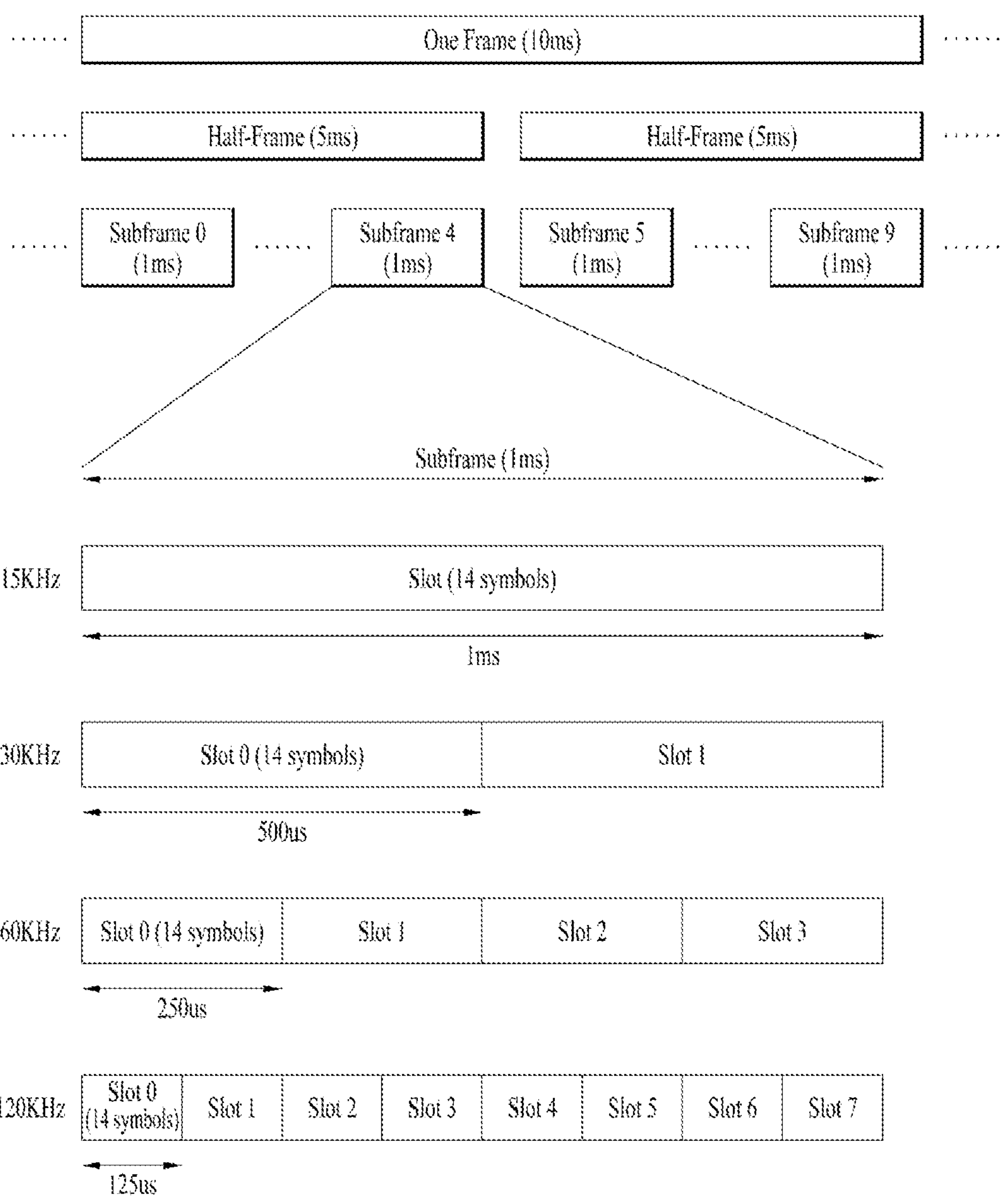
FIG. 4 illustrates an example of a frame structure used in a 3rd generation partnership project (3GPP)-based wireless communication system.

FIG. 4 illustrates an example of a frame structure used in a 3GPP-based wireless communication system.

The frame structure of FIG. 4 is purely exemplary and the number of subframes, the number of slots, and the number of symbols, in a frame, may be variously changed. In an NR system, different OFDM numerologies (e.g., subcarrier spacings (SCSs)) may be configured for multiple cells which are aggregated for one UE. Accordingly, the (absolute time) duration of a time resource including the same number of symbols (e.g., a subframe, a slot, or a transmission time interval (TTI)) may be differently configured for the aggregated cells. Here, the symbol may include an OFDM symbol (or cyclic prefix—OFDM (CP-OFDM) symbol) and an SC-FDMA symbol (or discrete Fourier transform-spread-OFDM (DFT-s-OFDM) symbol). In the present disclosure, the symbol, the OFDM-based symbol, the OFDM symbol, the CP-OFDM symbol, and the DFT-s-OFDM symbol are used interchangeably.

Referring to FIG. 4, in the NR system, UL and DL transmissions are organized into frames. Each frame has a duration of $T_f=(\Delta f_{max}*N_f/100)*T_c=10$ ms and is divided into two half-frames of 5 ms each. A basic time unit for NR is $T_c=1/(\Delta f_{max}*N_f)$ where $\Delta f_{max}=480*10^3$ Hz and $N_f=4096$. For reference, a basic time unit for LTE is $T_s=1/(\Delta f_{ref}*N_{f,ref})$ where $\Delta f_{ref}=15*10^3$ Hz and $N_{f,ref}=2048$. $T_c$ and $T_f$ have the relationship of a constant $K=T_c/T_f=64$. Each half-frame includes 5 subframes and a duration $T_{sf}$ of a single subframe is 1 ms. Subframes are further divided into slots and the number of slots in a subframe depends on a subcarrier spacing. Each slot includes 14 or 12 OFDM symbols based on a cyclic prefix. In a normal CP, each slot includes 14 OFDM symbols and, in an extended CP, each slot includes 12 OFDM symbols. The numerology depends on an exponentially scalable subcarrier spacing $\Delta f=2^u*15$ kHz. The table below shows the number of OFDM symbols ($N^{slot}_{symb}$) per slot, the number of slots ($N^{frame,u}_{slot}$) per frame, and the number of slots ($N^{subframe,u}_{slot}$) per subframe.

TABLE 1

| μ | $N^{slot}_{symb}$ | $N^{frame,u}_{slot}$ | $N^{subframe,u}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |

TABLE 1-continued

| μ | $N^{slot}_{symb}$ | $N^{frame,u}_{slot}$ | $N^{subframe,u}_{slot}$ |
|---|---|---|---|
| 4 | 14 | 160 | 16 |

The table below shows the number of OFDM symbols per slot, the number of slots per frame, and the number of slots per subframe, according to the subcarrier spacing $\Delta f=2^u*15$ KHz.

TABLE 2

| μ | $N^{slot}_{symb}$ | $N^{frame,u}_{slot}$ | $N^{subframe,\mu}_{slot}$ |
|---|---|---|---|
| 2 | 12 | 40 | 4 |

For a subcarrier spacing configuration u, slots may be indexed within a subframe in ascending order as follows: $n^u_s \in \{0, \ldots, n^{subframe,u}_{slot}-1\}$ and indexed within a frame in ascending order as follows: $n^u_{s,f} \in \{0, \ldots, n^{frame,u}_{slot}-1\}$.

The slot includes multiple (e.g., 14 or 12) symbols in the time domain. For each numerology (e.g., subcarrier spacing) and carrier, a resource grid of $N^{size,u}_{grid,x}*N^{RD}_{sc}$ subcarriers and $N^{subframe,u}_{symb}$ OFDM symbols is defined, starting at a common resource block (CRB) $N^{start,u}_{grid}$ indicated by higher layer signaling (e.g., RRC signaling), where $N^{size,u}_{grid,x}$ is the number of resource blocks (RBs) in the resource grid and the subscript x is DL for downlink and UL for uplink. $N^{RB}_{sc}$ is the number of subcarriers per RB. In the 3GPP-based wireless communication system, $N^{RB}_{sc}$ is typically 12. There is one resource grid for a given antenna port p, a subcarrier spacing configuration u, and a transmission link (DL or UL). The carrier bandwidth $N^{size,u}_{grid}$ for the subcarrier spacing configuration u is given to the UE by a higher layer parameter (e.g., RRC parameter). Each element in the resource grid for the antenna port p and the subcarrier spacing configuration u is referred to as a resource element (RE) and one complex symbol may be mapped to each RE. Each RE in the resource grid is uniquely identified by an index k in the frequency domain and an index l representing a symbol location relative to a reference point in the time domain. In the NR system, an RB is defined by 12 consecutive subcarriers in the frequency domain. In the NR system, RBs are classified into CRBs and physical resource blocks (PRBs). The CRBs are numbered from 0 upwards in the frequency domain for the subcarrier spacing configuration u. The center of subcarrier 0 of CRB 0 for the subcarrier spacing configuration u is equal to 'Point A' which serves as a common reference point for RB grids. The PRBs for subcarrier spacing configuration u are defined within a bandwidth part (BWP) and numbered from 0 to $N^{size,u}_{BWP,i}-1$, where i is a number of the BWP. The relation between a PRB $n_{PRB}$ in a BWP i and a CRB $n^u_{CRB}$ is given by: $n^u_{PRB}=n^u_{CRB}+N^{size,u}_{BWP,i}$, where $N^{size}_{BWP,i}$ is a CRB in which the BWP starts relative to CRB 0. The BWP includes a plurality of consecutive RBs in the frequency domain. For example, the BWP may be a subset of contiguous CRBs defined for a given numerology $u_i$ in the BWP i on a given carrier. A carrier may include a maximum of N (e.g., 5) BWPs. The UE may be configured to have one or more BWPs on a given component carrier. Data communication is performed through an activated BWP and only a predetermined number of BWPs (e.g., one BWP) among BWPs configured for the UE may be active on the component carrier.

The UE for which carrier aggregation is configured may be configured to use one or more cells. If the UE is configured with a plurality of serving cells, the UE may be configured with one or multiple cell groups. The UE may also be configured with a plurality of cell groups associated with different BSs. Alternatively, the UE may be configured with a plurality of cell groups associated with a single BS. Each cell group of the UE includes one or more serving cells and includes a single PUCCH cell for which PUCCH resources are configured. The PUCCH cell may be a Pcell or an Scell configured as the PUCCH cell among Scells of a corresponding cell group. Each serving cell of the UE belongs to one of cell groups of the UE and does not belong to a plurality of cells.

Figure 5:
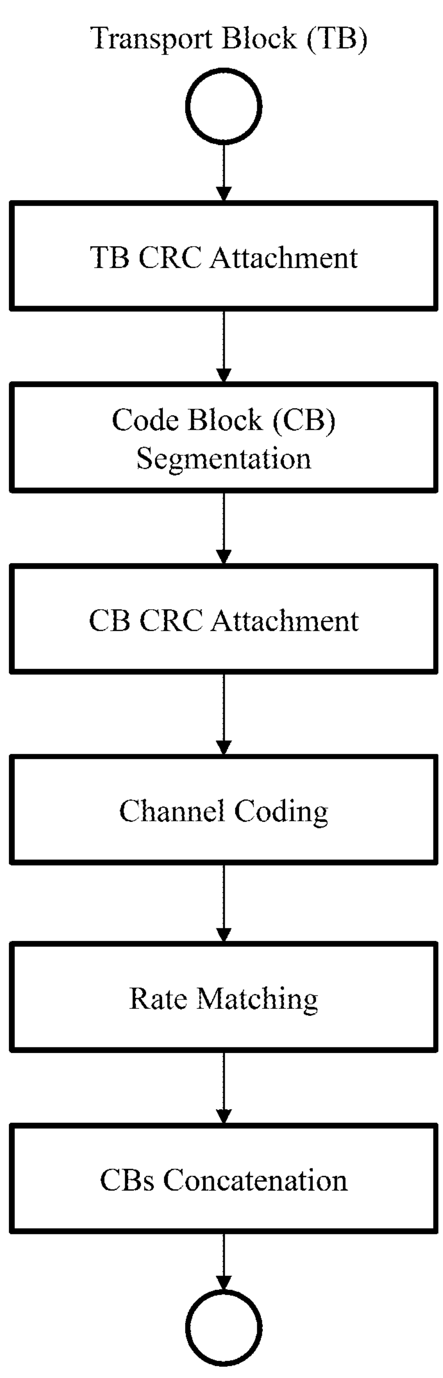
FIG. 5 illustrates a process for processing a transport block (TB) on a transmitting side.

FIG. 5 illustrates a process for processing a transport block (TB) on a transmitting side.

In order for a receiving side to correct errors that radio signals experience in a radio channel, a transmitting side encodes information using a forward error correction code and then transmits the encoded information. The receiving side demodulates a received signal and decodes the error correction code to thereby recover the information transmitted by the transmitting side. In this decoding procedure, errors in the received signal caused by a radio channel are corrected.

Data arrives at a coding block in the form of a maximum of two transport blocks every transmission time interval (TTI) in each DL/UL cell. The following coding steps may be applied to each transport block of the DL/UL cell:

cyclic redundancy check (CRC) attachment to a transport block;

code block segmentation and CRC attachment to a code block;

channel coding;

rate matching; and code block concatenation.

In an actual communication system, a transport block of a predetermined size or larger is divided into a plurality of smaller data blocks and then is encoded, to facilitate actual implementation of coding. The smaller data blocks are called code blocks. While the code blocks are generally of the same size, one of the code blocks may have a different size due to a limited size of an internal interleaver of a channel encoder. Error correction coding is performed on each code block of a predetermined interleaver size and then interleaving is performed to reduce the impact of burst errors that are generated during transmission over a radio channel. The error-corrected and interleaved code block is transmitted by being mapped to an actual radio resource. The amount of radio resources used for actual transmission is designated. Thus, the encoded code blocks are rate-matched to the amount of the radio resources. In general, rate matching is performed through puncturing or repetition. For example, if the amount of radio resources, i.e., the number of transmission bits capable of being transmitted on the radio resources, is M and if a coded bit sequence, i.e., the number of output bits of the encoder, is N, in which M is different from N, then rate matching is performed to match the length of the coded bit sequence to M. If M>N, then all or a part of bits of the coded bit sequence are repeated to match the length of the rate-matched sequence to M. If M<N, then a part of the bits of the coded bit sequence is punctured to match the length of the rate-matched sequence to M and the punctured bits are excluded from transmission.

In wireless communication systems, the transmitting side encodes data to be transmitted based on channel coding with a specific code rate. Then, the transmitting side adjusts the code rate of the data to be transmitted through a rate matching process involving puncturing and repetition.

There are various types of error correction codes, but the size of an information block capable of achieving optimal performance is determined depending on the error correction code. While many coding schemes are available for achieving high-capacity information performance with long information block lengths, the majority of the coding schemes do not consistently show good performance over a wide range of information block lengths and code rates. However, turbo codes, low-density parity check (LPDC) codes, and polar codes show promising BLER performance in a wide range of coding rates and code lengths and hence are considered to be used in the NR system. As demand for various cases such as eMBB, massive IoT, and URLLC has increased, a coding scheme providing greater channel coding efficiency than in turbo codes is needed. In addition, increase in a maximum number of subscribers capable of being accommodated by a channel, i.e., increase in capacity, has been required. Polar codes among various error correction codes are codes providing a new framework capable of solving problems of legacy channel codes and were invented by Arikan at Bilkent University (reference: E. Arikan, "Channel Polarization: A Method for Constructing Capacity-Achieving Codes for Symmetric Binary-Input Memoryless Channels," in IEEE Transactions on Information Theory, vol. 55, no. 7, pp. 3051-3073, July 2009). Polar codes are the first capacity-achieving codes with low encoding and decoding complexities, which were proven mathematically. Polar codes outperform the turbo codes in large information block lengths while no error flow is present. Hereinafter, channel coding using the polar codes is referred to as polar coding.

Polar codes are known as codes capable of achieving the capacity of a given binary discrete memoryless channel. This can be achieved only when a block size is sufficiently large. That is, polar codes are codes capable of achieving the capacity of a channel if the size N of the codes infinitely increases. Polar codes have low encoding and decoding complexity and may be successfully decoded. Polar codes are a sort of linear block error correction codes. Multiple recursive concatenations are basic building blocks for the polar codes and are bases for code construction. Physical conversion of channels in which physical channels are converted into virtual channels occurs and such conversion is based on a plurality of recursive concatenations. If multiple channels are multiplied and accumulated, most of the channels may become better or worse. The idea underlying polar codes is to use good channels. For example, data is sent through good channels at rate 1 and data is sent through bad channels at rate 0. That is, through channel polarization, channels enter a polarized state from a normal state.

Figure 6:
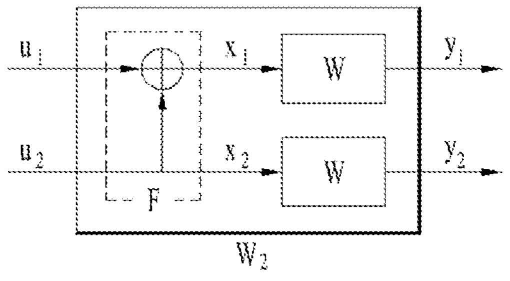
FIG. 6 is an exemplary block diagram for a polar encoder.

FIG. 6 is an example of a block diagram for a polar encoder.

FIG. 6(*a*) illustrates a base module of a polar code, particularly, first level channel combining for polar coding. In FIG. 6(*a*), $W_2$ denotes an entire equivalent channel obtained by combining two binary-input discrete memoryless channels (B-DMCs), Ws. Herein, $u_1$ and $u_2$ are binary-input source bits and $y_1$ and $y_2$ are output coded bits. Channel combining is a procedure of concatenating the B-DMCs in parallel.

FIG. 6(*b*) illustrates a base matrix F for the base module. The binary-input source bits $u_1$ and $u_2$ input to the base matrix F and the output coded bits $x_1$ and $x_2$ of the base matrix F have the following relationship.

$$[u_1 \ \ u_2]\begin{bmatrix} 1 & 0 \\ 1 & 1 \end{bmatrix} = [x_1 \ \ x_2] \quad \text{Equation 1}$$

The channel $W_2$ may achieve symmetric capacity I(W) which is a highest rate. In the B-DMC W, symmetric capacity is an important parameter which is used to measure a rate and is a highest rate at which reliable communication can occur over the channel W. The B-DMC may be defined as follows.

$$I(W) = \sum_{y \in Y} \sum_{x \in X} \frac{1}{2} W(y \mid x) \log \frac{w(y \mid x)}{\frac{1}{2} w(y \mid 0) + \frac{1}{2} w(y \mid 1)} \quad \text{Equation 2}$$

It is possible to synthesize or create a second set of N binary input channels out of N independent copies of a given B-DMC W and the channels have the properties $\{W_N^{(i)}: 1<=i<=N\}$. If N increases, there is a tendency for a part of the channels to have capacity approximating to 1 and for the remaining channels to have capacity approximating to 0. This is called channel polarization. In other words, channel polarization is a process of creating a second set of N channels $\{W_N^{(i)}: 1<=i<=N\}$ using N independent copies of a given B-DMC W. The effect of channel polarization means that, when N increases, all symmetric capacity terms $\{I(W_N^{(i)})\}$ tend towards 0 or 1 for all except a vanishing fraction of indexes i. In other words, the concept behind channel polarization in the polar codes is transforming N copies (i.e., N transmissions) of a channel having a symmetric capacity of I(W) (e.g., additive white Gaussian noise channel) into extreme channels of capacity close to 1 or 0. Among the N channels, an I(W) fraction will be perfect channels and an 1-I(W) fraction will be completely noise channels. Then, information bits are transmitted only through good channels and bits input to the other channels are frozen to 1 or 0. The amount of channel polarization increases along with a block length. Channel polarization consists of two phases: channel combining phase and channel splitting phase.

Figure 7:
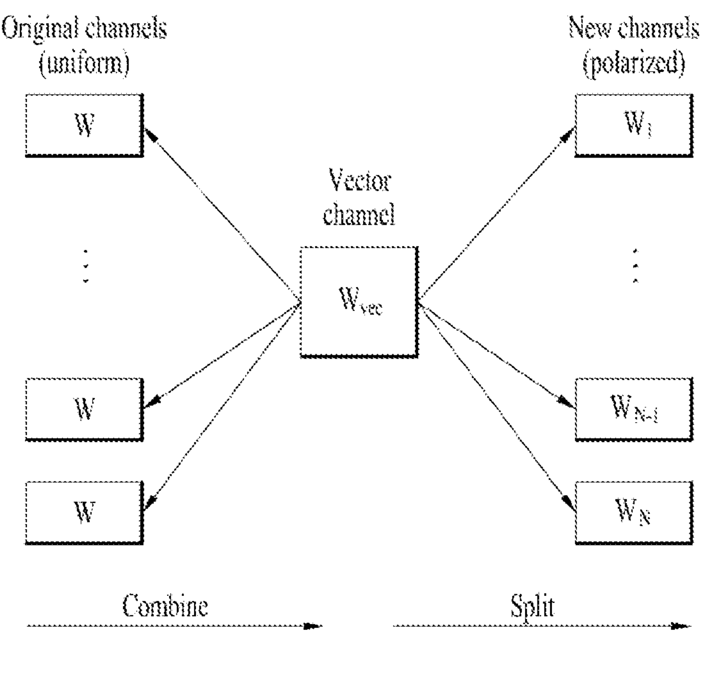
FIG. 7 illustrates the concept of channel splitting and channel combining for channel polarization.
Figure 7:
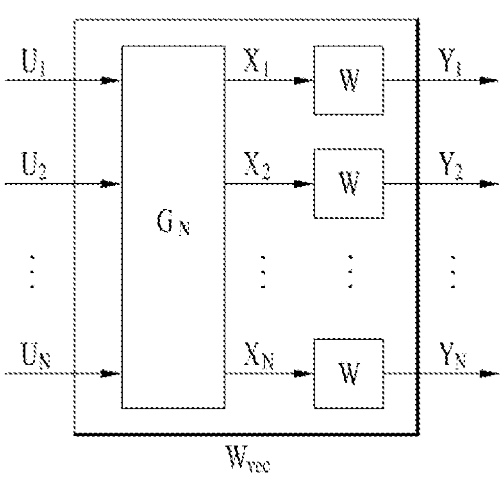

FIG. 7 illustrates the concept of channel combining and channel splitting for channel polarization. As illustrated in FIG. 7, when N copies of an original channel W are properly combined to create a vector channel $W_{vec}$ and then are split into new polarized channels, the new polarized channels are categorized into channels having capacity C(W)=1 and channels having C(W)=0 if N is sufficiently large. In this case, since bits passing through the channels having the channel capacity C(W))=1 are transmitted without error, it is better to transmit information bits therethrough and, since bits passing through the channels having capacity C(W)=0 cannot transport information, it is better to transport frozen bits, which are meaningless bits, therethrough.

Referring to FIG. 7(*a*), copies of a given B-DMC W are combined in a recursive manner to output a vector channel $W_{vec}$ given by $X_N \rightarrow Y_N$, where $N=2^n$ and n is an integer equal to or greater than 0. Recursion always begins at the 0th level and $W_1=W$. If n is 1 (n=1), this means the first level of recursion in which two independent copies of $W_1$ are combined. If the above two copies are combined, a channel $W_2$: $X_2 \rightarrow Y_2$ is obtained. A transitional probability of this new channel $W_2$ may be represented by the following equation.

$$W_2(y_1, y_2 \mid u_1, u_2) = W(y_1 \mid u_1 \oplus u_2) W(y_1 \mid u_2) \quad \text{Equation 3}$$

If the channel $W_2$ is obtained, two copies of the channel $W_2$ are combined to obtain a single copy of a channel $W_4$. Such recursion may be represented by $W_4$: $X_4 \rightarrow Y_4$ having the following transitional probability.

$$W_4(y_1^4 \mid u_1^4) = W_2(y_1^2 \mid u_1 \oplus u_2, u_3 \oplus u_4) W_2(y_3^4 \mid u_2, u_4) \quad \text{Equation 4}$$

In FIG. 7(*b*), $G_N$ is a size-N generator matrix. The relationship between input $u^N_1$ to $G_N$ and output $x^N_1$ of $G_N$ of FIG. 7(*b*) may be represented as $x^N_1=u^N_1 G_N$, where $x^N_1=\{x_1, \ldots, x_N\}$, $u^N_1=\{u_1, \ldots, u_N\}$. When N B-DMCs are combined, each B-DMC may be expressed in a recursive manner. That is, $G_N$ may be indicated by the following equation.

$$G_N = B_N F^{Wn} \quad \text{Equation 5}$$

Herein, $\otimes$ denotes the Kronecker product, $N=2^n$, $n>=1$, $F^{\otimes n}=F \otimes F_{\otimes (n-1)}$, and $F_{\otimes 0}=1$. $B_N$ is a permutation matrix known as a bit-reversal operation and $B_N=R_N(I_2 \otimes B_{N/2})$ and may be recursively computed. $I_2$ is a 2-dimensional identity matrix and this recursion is initialized to $B_2=I_2$. $R_N$ is a bit-reversal interleaver and is used to map an input $s^N_1=\{s_1, \ldots, s_N\}$ to an output $x^N_1=\{s_1, s_3, \ldots, s_{N-1}, s_2, \ldots, s_N\}$. For example, $G_2$ corresponds to a base matrix F shown in FIG. 6(*b*). $G_4$ may be expressed as the following matrix.

$$G_4 = \begin{bmatrix} 1 & 0 & 0 & 0 \\ 0 & 0 & 1 & 0 \\ 0 & 1 & 0 & 0 \\ 0 & 0 & 0 & 1 \end{bmatrix} \begin{bmatrix} 1 & 0 \\ 1 & 1 \end{bmatrix}^{\otimes 2} = \begin{bmatrix} 1 & 0 & 0 & 0 \\ 1 & 0 & 1 & 0 \\ 1 & 1 & 0 & 0 \\ 1 & 1 & 1 & 1 \end{bmatrix} \quad \text{Equation 6}$$

A bit-reversal interleaver may not be included on the transmitting side. Without considering the bit-reversal interleaver, $G_N$ may be expressed as $G_N=(G_2)^{\otimes n}$ (where $N=2^n$). $(G_2)^{\otimes n}$ denotes the n-th Kronecker power of the matrix $G_2$, where $G_2$ is the same as the basic matrix F shown in FIG. 6(*b*).

Figure 8:
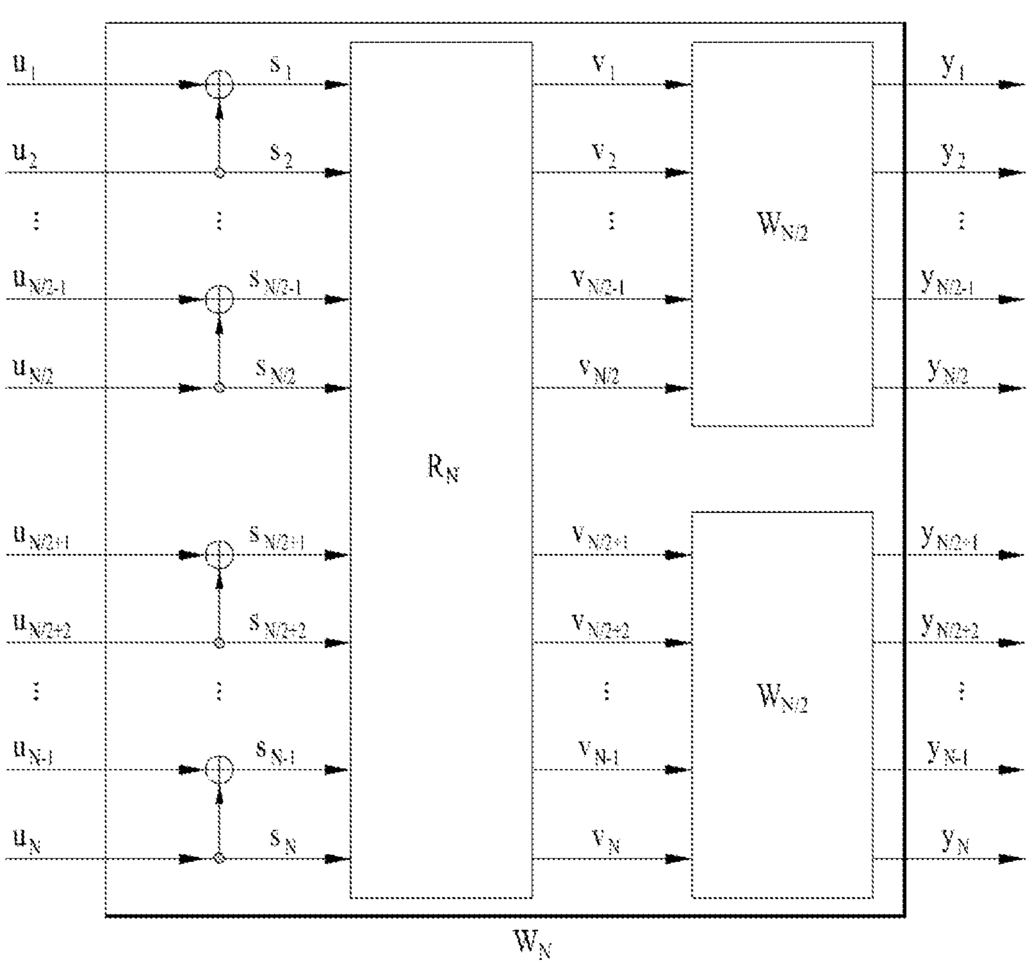
FIG. 8 illustrates N-th level channel combining for polar codes.

The relationship of Equation 5 is illustrated in FIG. 8.

FIG. 8 illustrates N-th level channel combining for a polar code.

A process of defining an equivalent channel for specific input after combining N B-DMCs Ws is called channel splitting. Channel splitting may be represented as a channel transition probability indicated by the following equation.

$$W_N^i(y_1^N, u_1^{i-1} \mid u_i) = \sum_{u_{i+1}^N} \frac{1}{2^{N-1}} W_N(y_1^N \mid u_1^N) \quad \text{Equation 7}$$

Channel polarization has the following characteristics:

> Conservation: $C(W^-)+C(W^+)=2C(W)$,

> Extremization: $C(W^-)<=C(W)<=C(W^+)$.

When channel combining and channel splitting are performed, the following theorem may be obtained.

Theorem: For any B-DMC W, channels $\{W_N^{(i)}\}$ are polarized in the following sense. For any fixed $\delta \in \{0, 1\}$, as N goes to infinity through powers of 2, the fraction of indexes $i \in \{1, \ldots, N\}$ for channel capacity $I(W_N^{(i)}) \in (1-\delta, 1]$ goes to I(W) and the faction of i for channel capacity $I(W_N^{(1)} \in [0, \delta)$ goes to 1-I(W). Hence, if $N \rightarrow \infty$, then channels are perfectly noisy or are polarized free of noise. These channels can be accurately recognized by the transmitting side. Therefore, bad channels are fixed and non-fixed bits may be transmitted on good channels.

That is, if the size N of polar codes is infinite, a channel has much noise or is free of noise, with respect to a specific input bit. This has the same meaning that the capacity of an equivalent channel for a specific input bit is divided into 0 or I(W).

Inputs of a polar encoder are divided into bit channels to which information data is mapped and bit channels to which the information data is not mapped. As described earlier, according to the theorem of the polar code, if a codeword of the polar code goes to infinity, the input bit channels may be classified into noiseless channels and noise channels. Therefore, if information is allocated to the noiseless bit channels, channel capacity may be obtained. However, in actuality, a codeword of an infinite length cannot be configured, reliabilities of the input bit channels are calculated and data bits are allocated to the input bit channels in order of reliabilities. In the present disclosure, bit channels to which data bits are allocated are referred to as good bit channels. The good bit channels may be input bit channels to which the data bits are mapped. Bit channels to which data is not mapped are referred to as frozen bit channels. A known value (e.g., 0) is input to the frozen bit channels and then encoding is performed. Any values which are known to the transmitting side and the receiving side may be mapped to the frozen bit channels. When puncturing or repetition is performed, information about the good bit channels may be used. For example, positions of codeword bits (i.e., output bits) corresponding to positions of input bits to which information bits are not allocated may be punctured.

A decoding scheme of the polar codes is a successive cancellation (SC) decoding scheme. The SC decoding scheme obtains a channel transition probability and then calculates a likelihood ratio (LLR) of input bits using the channel transition probability. In this case, the channel transition probability may be calculated in a recursive form if channel combining and channel splitting procedures use characteristics of the recursive form. Therefore, a final LLR value may also be calculated in the recursive form. First, a channel transition probability $W_N^{(i)}(y_1^N, u_1^{i-1}|u_1)$ of an input bit $u_i$ may be obtained as follows. $u_1^i$ may be split into odd indexes and even indexes as expressed as $u_{1,o}^i$, $u_{1,e}^i$, respectively. The channel transition probability may be indicated by the following equations.

Equation 8

$$\begin{aligned}
W_{2N}^{(2i-1)}\left(y_1^{2N}, u_1^{2i-1}|u_{2i-1}\right) &= \sum_{u_{2i}^{2N}} \frac{1}{2^{2N-1}} W_{2N}\left(y_1^{2N}|u_1^{2N}\right) \\
&= \sum_{u_{2i,o}^{2N}, u_{2i,e}^{2N}} \frac{1}{2^{2N-1}} W_N\left(y_1^N|u_{1,o}^{2N} \oplus u_{i,e}^{2N}\right) W_N\left(y_{N+1}^{2N}|u_{1,e}^{2N}\right) \\
&= \sum_{u_{2,i}} \frac{1}{2} \sum_{u_{2i+1,e}^{2N}} \frac{1}{2^{N-1}} W_N\left(y_{N+1}^{2N}|u_{1,e}^{2N}\right) \cdot \sum_{u_{2i+1,o}^{2N}} \frac{1}{2^{N-1}} W_N\left(y_1^N|u_{1,o}^{2N} \oplus u_{1,e}^{2N}\right) \\
&= \sum_{u_{2i}} \frac{1}{2} W_N^{(i)}\left(y_1^N, u_{1,o}^{2i-2} \oplus u_{i,e}^{2i-2}|u_{2i-1} \oplus u_{2i}\right) \cdot W_N^{(i)}\left(y_{N+1}^{2N}, u_{1,e}^{2i-2}|u_{2i}\right)
\end{aligned}$$

where $W_N^{(i)}\left(y_1^N, u_1^{i-1}|u_i\right) = \sum_{u_{i+1}^N} \frac{1}{2^{N-1}} W_N\left(y_1^N|u_1^N\right)$.

Equation 9

$$\begin{aligned}
W_{2N}^{(2i)}\left(y_1^{2N}, u_1^{2i-1}|u_{2i}\right) &= \sum_{u_{2i+1}^{2N}} \frac{1}{2^{2N-1}} W_{2N}\left(y_1^{2N}|u_1^{2N}\right) \\
&= \sum_{u_{2i+1,o}^{2N}, u_{2i+1,e}^{2N}} \frac{1}{2^{2N-1}} W_N\left(y_1^N|u_{1,o}^{2N} \oplus u_{i,e}^{2N}\right) W_N\left(y_{N+1}^{2N}|u_{1,e}^{2N}\right) \\
&= \frac{1}{2} \sum_{u_{2i+1,e}^{2N}} \frac{1}{2^{N-1}} W_N\left(y_{N+1}^{2N}|u_{1,e}^{2N}\right) \cdot \sum_{u_{2i+1,o}^{2N}} \frac{1}{2^{N-1}} W_N\left(y_1^N|u_{1,o}^{2N} \oplus u_{i,e}^{2N}\right) \\
&= \frac{1}{2} W_N^{(i)}\left(y_1^N, u_{1,o}^{2i-2} \oplus u_{i,e}^{2i-2}|u_{2i-1} \oplus u_{2i}\right) \cdot W_N^{(i)}\left(y_{N+1}^{2N}, u_{1,e}^{2i-2}|u_{2i}\right)
\end{aligned}$$

A polar decoder retrieves information and generates an estimate $\hat{u}_1^N$ of $u_1^N$ using values (e.g., reception bits, frozen bits, etc.) known for the polar codes. The LLR is defined as follows.

Equation 10

$$L_N^{(i)}\left(y_1^N, u_1^{i-1}\right) = \frac{W_N^{(i)}\left(y_1^N, u_1^{i-1}|u_i = 0\right)}{W_N^{(i)}\left(y_1^N, u_1^{i-1}|u_i = 1\right)}$$

The LLR may be recursively calculated as follows.

Equation 11

$$L_N^{(2i-1)}\left(y_1^N, \hat{u}_1^{2i-2}\right) = \frac{L_{N/2}^{(i)}\left(y_1^{N/2}, \hat{u}_{1,o}^{2i-2} \oplus \hat{u}_{1,e}^{2i-2}\right) \cdot L_{N/2}^{(i)}\left(y_{N/2+1}^N, \hat{u}_{1,e}^{2i-2}\right) + 1}{L_{N/2}^{(i)}\left(y_1^{N/2}, \hat{u}_{1,o}^{2i-2} \oplus \hat{u}_{1,e}^{2i-2}\right) + L_{N/2}^{(i)}\left(y_{N/2+1}^N, \hat{u}_{1,e}^{2i-2}\right)}$$

$$L_N^{(2i)}\left(y_1^N, \hat{u}_1^{2i-1}\right) = \left[L_{N/2}^{(i)}\left(y_1^{N/2}, \hat{u}_{1,o}^{2i-2} \oplus \hat{u}_{1,e}^{2i-2}\right)\right]^{1-2\hat{u}_{2i-1}} \cdot L_{N/2}^{(i)}\left(y_{N/2+1}^N, \hat{u}_{1,e}^{2i-2}\right)$$

Recursive calculation of LLRs is traced back to a code length of 1 with an LLR $L^{(1)}{}_1(y_i)=W(y_i|0)/W(y_i|1)$. $L^{(1)}{}_1(y_i)$ is soft information observed from a channel.

The complexity of a polar encoder and an SC decoder varies with the length N of polar codes and is known as having O(NlogN). Assuming that K input bits are used for a length-N polar code, a coding rate becomes N/K. If a generator matrix of a polar encoder of a data payload size N is $G_N$, an encoded bit may be represented as $x^N{}_1=u^N{}_1\ G_N$. It is assumed that K bits out of $u^N{}_1$ correspond to payload bits, a row index of $G_N$ corresponding to the payload bits is i, and a row index of $G_N$ corresponding to (N−K) bits is F. A minimum distance of the polar codes may be given as $d_{min}(C)=\min_{i\in I}2^{wt(i)}$, where wt(i) is the number of 1s within binary extension of i and i=0,1, . . . ,N−1.

SC list (SCL) decoding is an extension of a basic SC decoder. In this type of decoder, L decoding paths are simultaneously considered in each decoding stage. Herein, L is an integer. In other words, in the case of the polar codes, a list-L decoding algorithm is an algorithm for simultaneously tracking L paths in a decoding process.

Figure 9:
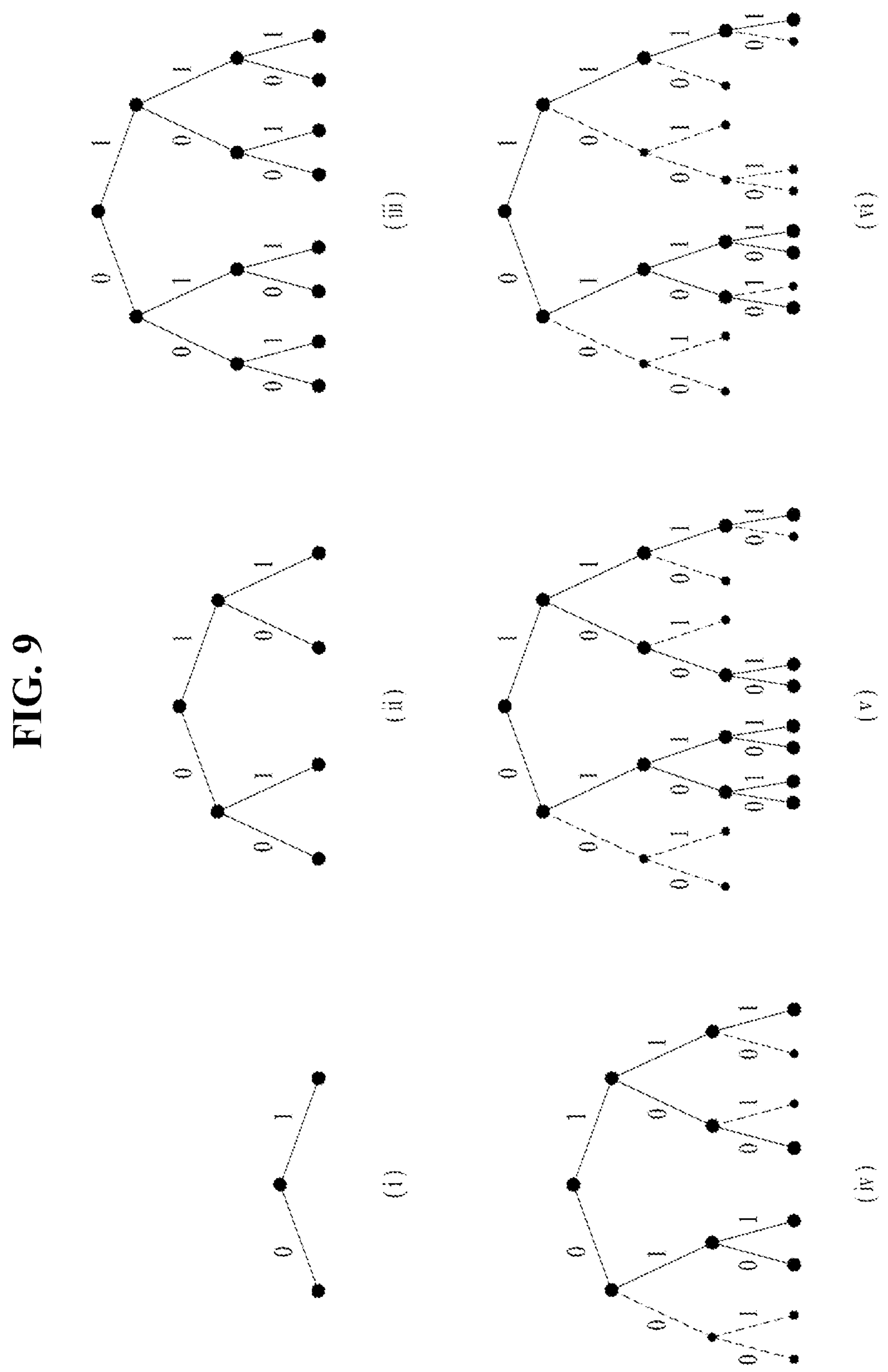
FIG. 9 illustrates evolution of decoding paths in a list-L decoding process.

FIG. 9 illustrates an evolution of decoding paths in a list-L decoding process. For convenience of description, it is assumed that the number of bits that should be determined is n and all bits are not frozen. If a list size L is 4, each level includes at most 4 nodes with paths that continue downward. Discontinued paths are expressed by dotted lines in FIG. 9. A process in which decoding paths evolve in list-L decoding will now be described with reference to FIG. 9. i) If list-L decoding is started, the first unfrozen bit may be either 0 or 1. ii) list-L decoding continues. The second unfrozen bits may be either 0 or 1. Since the number of paths is not greater than L=4, pruning is not needed yet. iii) Consideration of all options for the first bit (i.e., a bit of the first level), the second bit (i.e. a bit of the second level), and the third bit (i.e., a bit of the third level) results in 8 decoding paths which are excessive because L=4. iv) the 8 decoding paths are pruned to L (=4) promising paths. v) 4 active paths continue by considering two options of the fourth unfrozen bit. In this case, the number of paths is doubled, i.e., 8 paths which are excessive because L=4. vi) The 8 paths are pruned back to L (=4) best paths. In the example of FIG. 7, 4 candidate codewords 0100, 0110, 0111, and 1111 are obtained and one of the codewords is determined to be a codeword most similar to an original codeword. In a similar manner to a normal decoding process, for example, in a pruning process or a process of determining a final codeword, a path in which the sum of LLR absolute values is largest may be selected as a survival path. If a CRC is present, the survival path may be selected through the CRC.

Meanwhile, CRC-aided SCL decoding is SCL decoding using CRC and improves the performance of polar codes. CRC is the most widely used technique in error detection and error correction in the field of information theory and coding. For example, if an input block of an error correction encoder has K bits and the length of information bits is k, and the length of CRC sequences is m bits, then K=k+m. CRC bits are a part of source bits for an error correction code. If the size of channel codes used for encoding is N, a code rate R is defined as R=K/N. CRC aided SCL decoding serves to detect an errorless path while a receiving device confirms a CRC code with respect to each path. An SCL decoder outputs candidate sequences to a CRC detector. The CRC detector feeds back a check result in order to aid in determining a codeword.

Although complicated as compared with an SC algorithm, SCL decoding or CRC aided SCL decoding has an advantage of excellent decoding performance. For more details of a list-L decoding algorithm of the polar codes, refer to 'I. Tal and A. Vardy, "List decoding of polar codes," in Proc. IEEE Int. Symp. Inf. Theory, pp. 1-5, Jul. 2011'.

In the polar codes, code design is independent of a channel and hence is not versatile for mobile fading channels. In addition, the polar codes have a disadvantage of limited application because the codes have recently been introduced and have not grown yet. That is, polar coding proposed up to now has many parts that have not been defined to apply to a wireless communication system. Therefore, the present disclosure proposes a polar coding method suitable for the wireless communication system.

FIG. 10 illustrates the concept of selecting position(s) to which information bit(s) are to be allocated in polar codes.

In the example of FIG. 10, it is assumed that the size N of mother codes is 8, i.e., the size N of polar codes is 8, and a code rate is 1/2.

In FIG. 10, $C(W_i)$ denotes the capacity of a channel $W_i$ and corresponds to the reliability of channels that input bits of a polar code experience. When channel capacities corresponding to input bit positions of the polar code are as illustrated in FIG. 10, reliabilities of the input bit positions are ranked as illustrated in FIG. 10. To transmit data at a code rate of 1/2, a transmitting device allocates 4 bits constituting the data to 4 input bit positions having high channel capacities among 8 input bit positions (i.e., input bit positions denoted as $u_4$, $u_6$, $u_7$, and $u_8$ among input bit positions $u_1$ to $u_8$ of FIG. 10) and freezes the other input bit positions. A generator matrix $G_8$ corresponding to the polar code of FIG. 10 is as follows. The generator matrix $G_8$ may be acquired based on $(G_2)^{\otimes n}$.

Equation 12

$$G_8 = \begin{vmatrix} 1 & 0 & 0 & 0 & 0 & 0 & 0 & 0 \\ 1 & 1 & 0 & 0 & 0 & 0 & 0 & 0 \\ 1 & 0 & 1 & 0 & 0 & 0 & 0 & 0 \\ 1 & 1 & 1 & 1 & 0 & 0 & 0 & 0 \\ 1 & 0 & 0 & 0 & 1 & 0 & 0 & 0 \\ 1 & 1 & 0 & 0 & 1 & 1 & 0 & 0 \\ 1 & 0 & 1 & 0 & 1 & 0 & 1 & 0 \\ 1 & 1 & 1 & 1 & 1 & 1 & 1 & 1 \end{vmatrix}$$

The input bit positions denoted as $u_1$ to $u_8$ of FIG. 10 correspond one by one to rows from the highest row to the lowest row of $G_8$. Referring to FIG. 10, it may be appreciated that the input bit corresponding to $u_8$ affects all output coded bits. On the other hand, it may be appreciated that the input bit corresponding to $u_1$ affects only $y_1$ among the output coded bits. Referring to Equation 12, when binary-input source bits $u_1$ to $u_8$ are multiplied by $G_8$, a row in which the input bits appear at all output bits is the lowest row [1, 1, 1, 1, 1, 1, 1, 1] in which all elements are 1, among rows of $G_8$. Meanwhile, a row in which the binary-input source bits appears at only one output bit is a row in which one element is 1 among the rows of $G_8$, i.e., a row [1, 0, 0, 0, 0, 0, 0, 0] in which a row weight is 1. Similarly, it may be appreciated that a row in which a row weight is 2 reflects input bits corresponding to the row in two output bits. Referring to FIG. 10 and Equation 12, $u_1$ to $u_8$ correspond one by one to the rows of $G_8$ and bit indexes for distinguishing between input positions of $u_1$ to $u_8$, i.e., bit indexes for distinguishing between the input positions, may be assigned to the rows of $G_8$.

Hereinafter, for Polar codes, it may be assumed that bit indexes from 0 to N−1 are sequentially allocated to rows of $G_N$ starting from the highest row having the smallest row weight with respect to N input bits. For example, referring to FIG. 10, a bit index 0 is allocated to the input position of $u_1$, i.e., the first row of $G_8$ and a bit index 7 is allocated to the input position of $u_8$, i.e., the last row of $G_8$. However, since the bit indexes are used to indicate input positions of the polar code, a scheme different from the above allocation scheme may be used. For example, bit indexes from 0 to N−1 may be allocated staring from the lowest row having the largest row weight.

In the case of output bit indexes, as illustrated in FIG. 10 and Equation 12, it may be assumed that bit indexes from 0 to N−1 or bit indexes from 1 to N are assigned to columns from the first column having the largest column weight to the last column having the smallest column weight among columns of $G_N$.

In Polar codes, setting of information bits and frozen bits is one of the most important elements in the configuration and performance of the polar code. That is, determination of ranks of input bit positions may be an important element in the performance and configuration of the polar code. For Polar codes, bit indexes may distinguish input or output positions of the polar code. In the present disclosure, a sequence obtained by enumerating reliabilities of bit positions in ascending or descending order are referred to as a bit index sequence or polar sequence. That is, the bit index sequence represents reliabilities of input or output bit positions of the polar code in ascending or descending order. A transmitting device inputs information bits to input bits having high reliabilities based on the input bit index sequence and performs encoding using the polar code. A receiving device may discern input positions to which information bits are allocated or input positions to which frozen bits are allocated, using the same or corresponding input bit index sequence. That is, the receiving device may perform polar decoding using an input bit index sequence which is identical to or corresponds to an input bit index sequence used by the transmitting device and using a corresponding polar code. In the following description, it may be assumed that an input bit index sequence is predetermined so that information bit(s) may be allocated to input bit position(s) having high reliabilities. In the present disclosure, the input bit index sequence is also called a Polar sequence.

Figure 11:
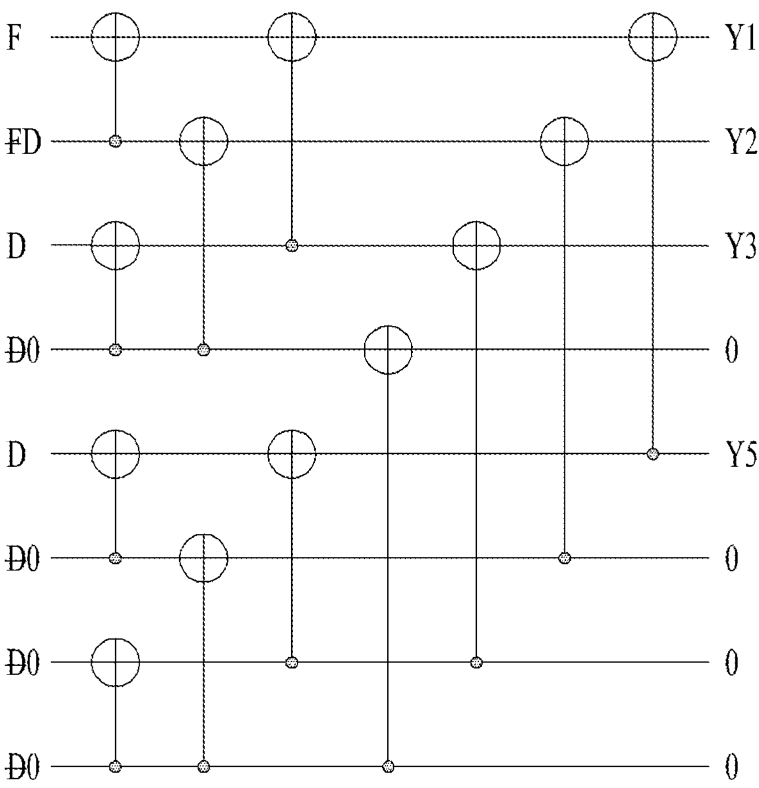
FIG. 11 illustrates puncturing and information bit allocation for polar codes.

FIG. 11 illustrates puncturing and information bit allocation for polar codes. In FIG. 11, F denotes a frozen bit, D denotes an information bit, and 0 denotes a skipping bit. Among coded bits, the case in which an information bit is changed to a frozen bit may occur according to an index or position of a punctured bit. For example, if output coded bits for a mother code of N=8 should be punctured in order of Y8, Y7, Y6, Y4, Y5, Y3, Y2, and Y1 and a target code rate is 1/2, then Y8, Y7, Y6, and Y4 are punctured, U8, U7, U6, and U4 connected only to Y8, Y7, Y6, and Y4 are frozen to 0, and these input bits are not transmitted, as illustrated in FIG. 9. An input bit changed to a frozen bit by puncturing of a coded bit is referred to as a skipping bit or a shortening bit and a corresponding input position is referred to as a skipping position or a shortening position. Shortening is a rate matching method of inserting a known bit into an input bit position connected to a position of an output bit desired to be transmitted while maintaining the size of input information (i.e., the size of information blocks). Shortening is possible starting from input corresponding to a column in which a column weight is 1 in a generator matrix $G_N$ and next shortening may be performed with respect to input corresponding to a column in which a column weight is 1 in a remaining matrix from which a column and row in which a column weight is 1 are removed. To prevent all information bits from being punctured, an information bit that should have been allocated to an information bit position may be reallocated in order of a high reliability within a set of frozen bit positions.

In the case of the polar code, decoding may be generally performed in the following order.

1. Bit(s) having low reliabilities are recovered first. Although reliability differs according to the structure of a decoder, since an input index in an encoder (hereinafter, an encoder input bit index or bit index) having a low value usually has a low reliability, decoding is generally performed staring from a low encoder input bit index.
2. When there is a known bit for a recovered bit, the known bit is used together with the recovered bit or the process of 1 is omitted and a known bit for a specific input bit position is immediately used, thereby recovering an information bit, which is an unknown bit. The information bit may be a source information bit (e.g., a bit of a transport block) or a CRC bit.

As explained earlier, the process of channel combining and channel splitting results in an equivalent channel being divided into a noisy channel and a noise-free channel. A data payload needs be transmitted over the noise-free channel. In other words, the data payload needs to be transmitted over the noise-free equivalent channel to achieve the desired performance. The noise-free equivalent channel may be determined by computing the value of the equivalent channel, $Z(W)=\Sigma\sqrt{W(y|0)W(y|1)}$ for each input bit. Z(W) is called the Battacharyya parameter, which may represent a value corresponding to the upper bound of the error probability when a MAP (maximum a posteriori probability) decision for transmission of binary input 0 or 1 is performed. Therefore, the transmitting side may obtain the values of Z(W), select equivalent channel(s) up to the size of the data payload in ascending order (e.g., decreasing order) of the values of Z(W), and use the equivalent channel(s) for transmission of the data payload. For a binary erasure channel (BEC), Z(W) may be obtained through Equation 13.

Equation 13

$$Z(W_N^{(i)}) = Z(W_{(b_1,b_2,\ldots,b_{k-1})}) = \begin{cases} 2Z(W_{(b_1,b_2,\ldots,b_{k-1})}) - Z(W_{(b_1,b_2,\ldots,b_{k-1})})^2, & \text{if } b_k = 0 \\ Z(W_{(b_1,b_2,\ldots,b_{k-1})})^2, & \text{if } b_k = 1 \end{cases}$$

For example, when the BEC has a binary probability of 0.5 and a code block size of 8, the values of Z(W) may be calculated according to Equation 11 as follows: Z(W)={1.00, 0.68, 0.81, 0.12, 0.88, 0.19, 0.32, 0.00}. Thus, when the size of a data payload is 2, the data payload may be transmitted over equivalent channel 8 with Z(W)=0.00 and equivalent channel 4 with Z(W)=0.12.

As described above, since a polar encoder has different reliability depending on input positions, the transmitting side may allocate a data block (i.e., an information block before encoding) to bit channel(s) in order of reliability according to the size of the corresponding data block and perform encoding by setting all others to be frozen (e.g., with a value of '0'). For example, if the mother code size of the polar encoder (i.e., the maximum size of a code block that the polar encoder is capable of encoding) is N, and if the size of a data block input to the polar encoder is K, polar encoding is performed by arranging the bits of the data block in order of reliability in K bit channels and setting 0 to N−K bit channel(s).

The following shows the polar sequence used in NR (5G) systems (see the polar sequence defined in 3GPP TS 38.212 Rel-15).

<Polar Sequence>

| W | I | W | I | W | I | W | I | W | I | W | I | W | I | W | I |
|---|---|---|---|---|---|---|---|---|---|---|---|---|---|---|---|
| 0 | 0 | 128 | 518 | 256 | 94 | 384 | 214 | 512 | 364 | 640 | 414 | 768 | 819 | 896 | 966 |
| 1 | 1 | 129 | 54 | 257 | 204 | 385 | 309 | 513 | 654 | 641 | 223 | 769 | 814 | 897 | 755 |
| 2 | 2 | 130 | 83 | 258 | 298 | 386 | 188 | 514 | 659 | 642 | 663 | 770 | 439 | 898 | 859 |
| 3 | 4 | 131 | 57 | 259 | 400 | 387 | 449 | 515 | 335 | 643 | 692 | 771 | 929 | 899 | 940 |
| 4 | 8 | 132 | 521 | 260 | 608 | 388 | 217 | 516 | 480 | 644 | 835 | 772 | 490 | 900 | 830 |
| 5 | 16 | 133 | 112 | 261 | 352 | 389 | 408 | 517 | 315 | 645 | 619 | 773 | 623 | 901 | 911 |
| 6 | 32 | 134 | 135 | 262 | 325 | 390 | 609 | 518 | 221 | 646 | 472 | 774 | 671 | 902 | 871 |
| 7 | 3 | 135 | 78 | 263 | 533 | 391 | 596 | 519 | 370 | 647 | 455 | 775 | 739 | 903 | 639 |
| 8 | 5 | 136 | 289 | 264 | 155 | 392 | 551 | 520 | 613 | 648 | 796 | 776 | 916 | 904 | 888 |
| 9 | 64 | 137 | 194 | 265 | 210 | 393 | 650 | 521 | 422 | 649 | 809 | 777 | 463 | 905 | 479 |
| 10 | 9 | 138 | 85 | 266 | 305 | 394 | 229 | 522 | 425 | 650 | 714 | 778 | 843 | 906 | 946 |
| 11 | 6 | 139 | 276 | 267 | 547 | 395 | 159 | 523 | 451 | 651 | 721 | 779 | 381 | 907 | 750 |
| 12 | 17 | 140 | 522 | 268 | 300 | 396 | 420 | 524 | 614 | 652 | 837 | 780 | 497 | 908 | 969 |
| 13 | 10 | 141 | 58 | 269 | 109 | 397 | 31 | 525 | 543 | 653 | 716 | 781 | 930 | 909 | 508 |
| 14 | 18 | 142 | 168 | 270 | 184 | 398 | 541 | 526 | 235 | 654 | 864 | 782 | 821 | 910 | 861 |
| 15 | 128 | 143 | 139 | 271 | 534 | 399 | 773 | 527 | 412 | 655 | 810 | 783 | 726 | 911 | 757 |
| 16 | 12 | 144 | 99 | 272 | 537 | 400 | 610 | 528 | 343 | 656 | 606 | 784 | 961 | 912 | 970 |
| 17 | 33 | 145 | 86 | 273 | 115 | 401 | 657 | 529 | 372 | 657 | 912 | 785 | 872 | 913 | 919 |
| 18 | 65 | 146 | 60 | 274 | 167 | 402 | 333 | 530 | 775 | 658 | 722 | 786 | 492 | 914 | 875 |
| 19 | 20 | 147 | 280 | 275 | 225 | 403 | 119 | 531 | 317 | 659 | 696 | 787 | 631 | 915 | 862 |
| 20 | 256 | 148 | 89 | 276 | 326 | 404 | 600 | 532 | 222 | 660 | 377 | 788 | 729 | 916 | 758 |
| 21 | 34 | 149 | 290 | 277 | 306 | 405 | 339 | 533 | 426 | 661 | 435 | 789 | 700 | 917 | 948 |
| 22 | 24 | 150 | 529 | 278 | 772 | 406 | 218 | 534 | 453 | 662 | 817 | 790 | 443 | 918 | 977 |
| 23 | 36 | 151 | 524 | 279 | 157 | 407 | 368 | 535 | 237 | 663 | 319 | 791 | 741 | 919 | 923 |
| 24 | 7 | 152 | 196 | 280 | 656 | 408 | 652 | 536 | 1559 | 664 | 621 | 792 | 845 | 920 | 972 |
| 25 | 129 | 153 | 141 | 281 | 329 | 409 | 230 | 537 | 833 | 665 | 812 | 793 | 920 | 921 | 761 |
| 26 | 66 | 154 | 101 | 282 | 110 | 410 | 391 | 538 | 804 | 666 | 484 | 794 | 382 | 922 | 877 |
| 27 | 512 | 155 | 147 | 283 | 117 | 411 | 313 | 539 | 712 | 667 | 430 | 795 | 822 | 923 | 952 |
| 28 | 11 | 156 | 176 | 284 | 212 | 412 | 450 | 540 | 834 | 668 | 838 | 796 | 851 | 924 | 495 |
| 29 | 40 | 157 | 142 | 285 | 171 | 413 | 542 | 541 | 661 | 669 | 667 | 797 | 730 | 925 | 703 |
| 30 | 68 | 158 | 530 | 286 | 776 | 414 | 3341 | 542 | 808 | 670 | 488 | 798 | 498 | 926 | 935 |
| 31 | 130 | 159 | 321 | 287 | 330 | 415 | 233 | 543 | 779 | 671 | 239 | 799 | 880 | 927 | 978 |
| 32 | 19 | 160 | 31 | 288 | 226 | 416 | 555 | 544 | 617 | 672 | 378 | 800 | 742 | 928 | 883 |
| 33 | 13 | 161 | 200 | 289 | 549 | 417 | 774 | 545 | 604 | 673 | 459 | 801 | 445 | 929 | 762 |
| 34 | 48 | 162 | 90 | 290 | 538 | 418 | 175 | 546 | 433 | 674 | 622 | 802 | 471 | 930 | 503 |
| 35 | 14 | 163 | 545 | 291 | 387 | 419 | 123 | 547 | 720 | 675 | 627 | 803 | 635 | 931 | 925 |
| 36 | 72 | 164 | 292 | 292 | 308 | 420 | 658 | 548 | 816 | 676 | 437 | 804 | 932 | 932 | 878 |
| 37 | 257 | 165 | 322 | 293 | 216 | 421 | 612 | 549 | 836 | 677 | 380 | 805 | 687 | 933 | 735 |
| 38 | 21 | 166 | 532 | 294 | 416 | 422 | 341 | 550 | 347 | 678 | 818 | 806 | 903 | 934 | 993 |
| 39 | 132 | 167 | 263 | 295 | 271 | 423 | 777 | 551 | 897 | 679 | 461 | 807 | 825 | 935 | 885 |
| 40 | 35 | 168 | 149 | 296 | 279 | 424 | 220 | 552 | 243 | 680 | 496 | 808 | 500 | 936 | 939 |
| 41 | 258 | 169 | 102 | 297 | 158 | 425 | 314 | 553 | 662 | 681 | 669 | 809 | 846 | 937 | 994 |
| 42 | 26 | 170 | 105 | 298 | 337 | 426 | 424 | 554 | 454 | 682 | 679 | 810 | 745 | 938 | 980 |
| 43 | 513 | 171 | 304 | 299 | 550 | 427 | 395 | 555 | 318 | 683 | 724 | 811 | 826 | 939 | 926 |
| 44 | 80 | 172 | 296 | 300 | 672 | 428 | 673 | 556 | 675 | 684 | 841 | 812 | 732 | 940 | 764 |
| 45 | 37 | 173 | 163 | 301 | 118 | 429 | 583 | 557 | 618 | 685 | 629 | 813 | 446 | 941 | 941 |
| 46 | 25 | 174 | 92 | 302 | 332 | 430 | 355 | 558 | 898 | 686 | 351 | 814 | 962 | 942 | 967 |
| 47 | 22 | 175 | 47 | 303 | 579 | 431 | 287 | 559 | 781 | 687 | 467 | 815 | 936 | 943 | 886 |
| 48 | 136 | 176 | 267 | 304 | 540 | 432 | 183 | 560 | 376 | 688 | 438 | 816 | 475 | 944 | 831 |
| 49 | 260 | 177 | 385 | 305 | 389 | 433 | 234 | 561 | 428 | 689 | 737 | 817 | 853 | 945 | 947 |
| 50 | 264 | 178 | 546 | 306 | 173 | 434 | 125 | 562 | 665 | 690 | 251 | 818 | 867 | 946 | 507 |
| 51 | 38 | 179 | 324 | 307 | 121 | 435 | 557 | 563 | 736 | 691 | 462 | 819 | 637 | 947 | 889 |
| 52 | 514 | 180 | 208 | 308 | 553 | 436 | 660 | 564 | 567 | 692 | 442 | 820 | 907 | 948 | 984 |
| 53 | 96 | 181 | 386 | 309 | 199 | 437 | 616 | 565 | 840 | 693 | 441 | 821 | 487 | 949 | 751 |
| 54 | 67 | 182 | 150 | 310 | 784 | 438 | 342 | 566 | 625 | 694 | 469 | 822 | 695 | 950 | 942 |
| 55 | 41 | 183 | 153 | 311 | 179 | 439 | 316 | 567 | 238 | 695 | 247 | 823 | 746 | 951 | 996 |
| 56 | 144 | 184 | 165 | 312 | 228 | 440 | 241 | 568 | 359 | 696 | 683 | 824 | 828 | 952 | 971 |
| 57 | 28 | 185 | 106 | 313 | 338 | 441 | 778 | 569 | 457 | 697 | 842 | 825 | 753 | 953 | 890 |
| 58 | 69 | 186 | 55 | 314 | 312 | 442 | 563 | 570 | 399 | 698 | 738 | 826 | 854 | 954 | 509 |
| 59 | 42 | 187 | 328 | 315 | 704 | 443 | 345 | 571 | 787 | 699 | 899 | 827 | 857 | 955 | 949 |
| 60 | 516 | 188 | 536 | 316 | 390 | 444 | 452 | 572 | 591 | 700 | 670 | 828 | 504 | 956 | 973 |
| 61 | 49 | 189 | 577 | 317 | 174 | 445 | 397 | 573 | 678 | 701 | 783 | 829 | 799 | 957 | 1000 |
| 62 | 74 | 190 | 548 | 318 | 554 | 446 | 403 | 574 | 434 | 702 | 849 | 830 | 255 | 958 | 892 |
| 63 | 272 | 191 | 113 | 319 | 581 | 447 | 207 | 575 | 677 | 703 | 820 | 831 | 964 | 959 | 950 |
| 64 | 160 | 192 | 154 | 320 | 393 | 448 | 674 | 576 | 349 | 704 | 728 | 832 | 909 | 960 | 863 |
| 65 | 520 | 193 | 79 | 321 | 283 | 449 | 558 | 577 | 245 | 705 | 928 | 833 | 719 | 961 | 759 |
| 66 | 288 | 194 | 269 | 322 | 122 | 450 | 785 | 578 | 458 | 706 | 791 | 834 | 477 | 962 | 1008 |

-continued

| W | I | W | I | W | I | W | I | W | I | W | I | W | I | W | I |
|---|---|---|---|---|---|---|---|---|---|---|---|---|---|---|---|
| 67 | 528 | 195 | 108 | 323 | 448 | 451 | 432 | 579 | 666 | 707 | 367 | 835 | 915 | 963 | 510 |
| 68 | 192 | 196 | 578 | 324 | 353 | 452 | 357 | 580 | 620 | 708 | 901 | 836 | 638 | 964 | 979 |
| 69 | 544 | 197 | 224 | 325 | 561 | 453 | 187 | 581 | 363 | 709 | 630 | 837 | 748 | 965 | 953 |
| 70 | 70 | 198 | 166 | 326 | 203 | 454 | 236 | 582 | 127 | 710 | 685 | 838 | 944 | 966 | 763 |
| 71 | 44 | 199 | 519 | 327 | 63 | 455 | 664 | 583 | 191 | 711 | 844 | 839 | 869 | 967 | 974 |
| 72 | 131 | 200 | 552 | 328 | 340 | 456 | 624 | 584 | 782 | 712 | 633 | 840 | 491 | 968 | 954 |
| 73 | 81 | 201 | 195 | 329 | 394 | 457 | 587 | 585 | 407 | 713 | 711 | 841 | 699 | 969 | 879 |
| 74 | 50 | 202 | 270 | 330 | 527 | 458 | 780 | 586 | 436 | 714 | 253 | 842 | 754 | 970 | 981 |
| 75 | 73 | 203 | 641 | 331 | 582 | 459 | 705 | 587 | 626 | 715 | 691 | 843 | 858 | 971 | 982 |
| 76 | 15 | 204 | 523 | 332 | 556 | 460 | 126 | 588 | 571 | 716 | 824 | 844 | 478 | 972 | 927 |
| 77 | 320 | 205 | 275 | 333 | 181 | 461 | 242 | 589 | 465 | 717 | 902 | 845 | 968 | 973 | 995 |
| 78 | 133 | 206 | 580 | 334 | 295 | 462 | 565 | 590 | 681 | 718 | 686 | 846 | 383 | 974 | 765 |
| 79 | 52 | 207 | 291 | 335 | 285 | 463 | 398 | 591 | 246 | 719 | 740 | 847 | 910 | 975 | 956 |
| 80 | 23 | 208 | 59 | 336 | 232 | 464 | 346 | 592 | 707 | 720 | 850 | 848 | 815 | 976 | 887 |
| 81 | 134 | 209 | 169 | 337 | 124 | 465 | 456 | 593 | 350 | 721 | 375 | 849 | 976 | 977 | 985 |
| 82 | 384 | 210 | 560 | 338 | 205 | 466 | 358 | 594 | 599 | 722 | 444 | 850 | 870 | 978 | 997 |
| 83 | 76 | 211 | 114 | 339 | 182 | 467 | 405 | 595 | 668 | 723 | 470 | 851 | 917 | 979 | 986 |
| 84 | 137 | 212 | 277 | 340 | 643 | 468 | 303 | 596 | 790 | 724 | 483 | 852 | 727 | 980 | 943 |
| 85 | 82 | 213 | 156 | 341 | 562 | 469 | 569 | 597 | 460 | 725 | 415 | 853 | 493 | 981 | 891 |
| 86 | 56 | 214 | 87 | 342 | 286 | 470 | 244 | 598 | 249 | 726 | 485 | 854 | 873 | 982 | 998 |
| 87 | 27 | 215 | 197 | 343 | 585 | 471 | 595 | 599 | 682 | 727 | 905 | 855 | 701 | 983 | 766 |
| 88 | 97 | 216 | 116 | 344 | 299 | 472 | 189 | 600 | 573 | 728 | 795 | 856 | 931 | 984 | 511 |
| 89 | 39 | 217 | 170 | 345 | 354 | 473 | 566 | 601 | 411 | 729 | 473 | 857 | 756 | 985 | 988 |
| 90 | 259 | 218 | 61 | 346 | 211 | 474 | 676 | 602 | 803 | 730 | 634 | 858 | 860 | 986 | 1001 |
| 91 | 84 | 219 | 531 | 347 | 401 | 475 | 361 | 603 | 789 | 731 | 744 | 859 | 499 | 987 | 951 |
| 92 | 138 | 220 | 525 | 348 | 185 | 476 | 706 | 604 | 709 | 732 | 852 | 860 | 731 | 988 | 1002 |
| 93 | 145 | 221 | 642 | 349 | 396 | 477 | 589 | 605 | 365 | 733 | 960 | 861 | 823 | 989 | 893 |
| 94 | 261 | 222 | 281 | 350 | 344 | 478 | 215 | 606 | 440 | 734 | 865 | 862 | 922 | 990 | 975 |
| 95 | 29 | 223 | 278 | 351 | 586 | 479 | 786 | 607 | 628 | 735 | 693 | 863 | 874 | 991 | 894 |
| 96 | 43 | 224 | 526 | 352 | 645 | 480 | 647 | 608 | 689 | 736 | 797 | 864 | 918 | 992 | 1009 |
| 97 | 98 | 225 | 177 | 353 | 593 | 481 | 348 | 609 | 374 | 737 | 906 | 865 | 502 | 993 | 955 |
| 98 | 515 | 226 | 293 | 354 | 535 | 482 | 419 | 610 | 423 | 738 | 715 | 866 | 933 | 994 | 1004 |
| 99 | 88 | 227 | 388 | 355 | 240 | 483 | 406 | 611 | 466 | 739 | 807 | 867 | 743 | 995 | 1010 |
| 100 | 140 | 228 | 91 | 356 | 206 | 484 | 464 | 612 | 793 | 740 | 474 | 868 | 760 | 996 | 957 |
| 101 | 30 | 229 | 584 | 357 | 95 | 485 | 680 | 613 | 250 | 741 | 636 | 869 | 881 | 997 | 983 |
| 102 | 146 | 230 | 769 | 358 | 327 | 486 | 801 | 614 | 371 | 742 | 694 | 870 | 494 | 998 | 958 |
| 103 | 71 | 231 | 198 | 359 | 564 | 487 | 362 | 615 | 481 | 743 | 254 | 871 | 702 | 999 | 987 |
| 104 | 262 | 232 | 172 | 360 | 800 | 488 | 590 | 616 | 574 | 744 | 717 | 872 | 921 | 1000 | 1012 |
| 105 | 265 | 233 | 120 | 361 | 402 | 489 | 409 | 617 | 413 | 745 | 575 | 873 | 501 | 1001 | 999 |
| 106 | 161 | 234 | 201 | 362 | 356 | 490 | 570 | 618 | 603 | 746 | 913 | 874 | 876 | 1002 | 1016 |
| 107 | 576 | 235 | 336 | 363 | 307 | 491 | 788 | 619 | 366 | 747 | 798 | 875 | 847 | 1003 | 767 |
| 108 | 45 | 236 | 62 | 364 | 301 | 492 | 597 | 620 | 468 | 748 | 811 | 876 | 992 | 1004 | 989 |
| 109 | 100 | 237 | 282 | 365 | 417 | 493 | 572 | 621 | 655 | 749 | 379 | 877 | 447 | 1005 | 1003 |
| 110 | 640 | 238 | 143 | 366 | 213 | 494 | 219 | 622 | 900 | 750 | 697 | 878 | 733 | 1006 | 990 |
| 111 | 51 | 239 | 103 | 367 | 568 | 495 | 311 | 623 | 805 | 751 | 431 | 879 | 827 | 1007 | 1005 |
| 112 | 148 | 240 | 178 | 368 | 832 | 496 | 708 | 624 | 615 | 752 | 607 | 880 | 934 | 1008 | 959 |
| 113 | 46 | 241 | 294 | 369 | 588 | 497 | 598 | 625 | 684 | 753 | 489 | 881 | 882 | 1009 | 1011 |
| 114 | 75 | 242 | 93 | 370 | 186 | 498 | 601 | 626 | 710 | 754 | 866 | 882 | 937 | 1010 | 1013 |
| 115 | 266 | 243 | 644 | 371 | 646 | 499 | 651 | 627 | 429 | 755 | 723 | 883 | 963 | 1011 | 895 |
| 116 | 273 | 244 | 202 | 372 | 404 | 500 | 421 | 628 | 794 | 756 | 486 | 884 | 747 | 1012 | 1006 |
| 117 | 517 | 245 | 592 | 373 | 227 | 501 | 792 | 629 | 252 | 757 | 908 | 885 | 505 | 1013 | 1014 |
| 118 | 104 | 246 | 323 | 374 | 896 | 502 | 802 | 630 | 373 | 758 | 718 | 886 | 855 | 1014 | 1017 |
| 119 | 162 | 247 | 392 | 375 | 594 | 503 | 611 | 631 | 605 | 759 | 813 | 887 | 924 | 1015 | 1018 |
| 120 | 53 | 248 | 297 | 376 | 418 | 504 | 602 | 632 | 848 | 760 | 476 | 888 | 734 | 1016 | 991 |
| 121 | 193 | 249 | 770 | 377 | 302 | 505 | 410 | 633 | 690 | 761 | 856 | 889 | 829 | 1017 | 1020 |
| 122 | 152 | 250 | 107 | 378 | 649 | 506 | 231 | 634 | 713 | 762 | 839 | 890 | 965 | 1018 | 1007 |
| 123 | 77 | 251 | 180 | 379 | 771 | 507 | 688 | 635 | 632 | 763 | 725 | 891 | 938 | 1019 | 1015 |
| 124 | 164 | 252 | 151 | 380 | 360 | 508 | 653 | 636 | 482 | 764 | 698 | 892 | 884 | 1020 | 1019 |
| 125 | 768 | 253 | 209 | 381 | 539 | 509 | 248 | 637 | 806 | 765 | 914 | 893 | 506 | 1021 | 1021 |
| 126 | 268 | 254 | 284 | 382 | 111 | 510 | 369 | 638 | 427 | 766 | 752 | 894 | 749 | 1022 | 1022 |
| 127 | 274 | 255 | 648 | 383 | 331 | 511 | 190 | 639 | 904 | 767 | 868 | 895 | 945 | 1023 | 1023 |

The above table shows a Polar sequence $Q_0^{Nmax-1}$ and a reliability $W(Q_i^{Nmax})$ of the Polar sequence. In the above table, W denotes $W(Q_i^{Nmax})$ and I denotes $Q_i^{Nmax}$. Namely, the Polar sequence $Q_0^{Nmax-1}=\{Q_0^{Nmax}, Q_1^{Nmax}, \ldots, Q_{Nmax-1}^{Nmax}\}$ is given by the above table, where $0<=Q_i^{Nmax}<=Nmax-1$ denotes a bit index (i.e., bit channel index) before Polar encoding for i=0,1, . . . ,Nmax−1. For 3GPP TS 38.212 Rel-15, Nmax=1024. The Polar sequence $Q_0^{Nmax-1}$ is ascending order of reliability $W(Q_0^{Nmax})<W(Q_1^{Nmax})< \ldots <W(Q_{Nmax-1}^{Nmax})$, where $W(Q_i^{Nmax})$ denotes the reliability of bit index $Q_i^{Nmax}$. For example, referring to the above table, a reliability $W(Q_i^{Nmax})=3$ of a bit index $Q_i^{Nmax}=4$ is lower than a reliability $W(Q_i^{Nmax})=7$ of bit index $Q_i^{Nmax}=3$. That is, the above table lists, in ascending order of reliability, bit indexes 0 to 1023 which respectively indicate 1024 input positions of a Polar code of Nmax=1024.

For any information block encoded to N bits, a same Polar sequence $Q_0^{N-1}=\{Q_0^N, Q_1^N, Q_2^N, \ldots, O_{N-1}^N\}$ is used. The Polar sequence $Q_0^{N-1}$ is a subset of Polar sequence $Q_0^{Nmax-1}$ with all elements $Q_i^{Nmax}$ of values less than N, ordered in ascending order of reliability $W(Q_0^N)<W(Q_0^N)<W(Q_2^N)< \ldots <W(Q_{N-1}^N)$. For example, when N=8, a Polar sequence $Q_0^7$ includes elements of $Q_i^{Nmax}<8$ among elements of the Polar sequence $Q_0^{Nmax-1}$ and the elements of $Q_i^{Nmax}<8$ are ordered in ascending order of reliability $W(0)<W(1)<W(2)<W(4)<W(3)<W(5)<W(6)$.

For example, Table 3 lists input bit positions for an information block of size K (=10) input to a Polar code in a Polar sequence of N=512.

TABLE 3

| | Polar sequence |
|---|---|
| 1 | 505 |
| 2 | 506 |
| 3 | 479 |
| 4 | 508 |
| 5 | 495 |
| 6 | 503 |
| 7 | 507 |
| 8 | 509 |
| 9 | 510 |
| 10 | 511 |

Table 3 shows 10 elements for K=10 among elements of the Polar sequence of N=512 in ascending order of reliability. Referring to the above-described table of <Polar sequence>, values of I having 10 reliabilities $W(Q_i^{Nmax})$ among values of I $(=Q_i^{Nmax})$ less than N=512 are {479, 495, 503, 505, 506, 507, 508, 509, 510, 511}. If {479, 495, 503, 505, 506, 507, 508, 509, 510, 511} are arranged in ascending order of reliability W, {505, 506, 479, 508, 495, 503, 507, 509, 510, 511}, which is a set of bit indexes for K=10 in the Polar sequence of N=512 shown in Table 3, may be obtained.

If the bit sequence input to channel coding is denoted by $c_0, c_1, c_2, c_3, \ldots, C_{K-1}$, the bits after encoding are denoted by $d_0, d_1, d_2, d_3, \ldots, d_{N-1}$, where K is the number of bits to encode, where $N=2^n$ and the value of n is determined by the following table.

TABLE 4

| |
|---|
| If $E \le (9/8)\cdot 2^{(\lceil \log_2 E \rceil - 1)}$ and $K / E < 9 / 16$ |
| $n_1 = \lceil \log_2 E \rceil - 1$; |
| else |
| $n_1 = \lceil \log_2 E \rceil$; |
| end if |
| $R_{min} = 1 / 8$; |
| $n_2 = \lceil \log_2(K / R_{min}) \rceil$; |
| $n = \max\{\min\{n_1, n_2, n_{max}\}, n_{min}\}$ |
| where $n_{min} = 5$. |

In Table 4, $n_{max}$ may be a value predetermined depending on the type of channel or control information and/or the number of information bits input into a channel coding block. For example, $n_{max}$ for a broadcast channel (BCH) may be predetermined as 9, $n_{max}$ for DCI may be predetermined as 9, and $n_{max}$ for UCI may be predetermined as 10.

In Table 4, E denotes a rate matching output sequence length. The rate matching output sequence length E may be predetermined depending on the type of channel, the type of control information, the amount of resources mapped to channel or control information, and/or the number of code blocks used for transmission of control information. For example, the rate matching output sequence length E for a BCH is 864, the rate matching output sequence length E for is 864, and the rate matching output sequence length E for UCI may be predetermined based on the number of OFDM symbols carrying the UCI, the number of RBs, a spreading factor, the number of code blocks for the UCI, and/or the type of UCI included in a UCI payload (e.g., HARQ-ACK, scheduling request (SR), channel state information (CSI), etc.).

For any information block encoded to N bits, a same Polar sequence $Q_0^{N-1}=\{Q_0^N, Q_1^N, Q_2^N, \ldots, Q_{N-1}^N\}$ is used. The Polar sequence $Q_0^{N-1}$ is a subset of Polar sequence $Q_0^{Nmax-1}$ with all elements $Q_i^{Nmax}$ of values less than N, ordered in ascending order of reliability $W(Q_0^N)<W(Q_1^N)<W(Q_2^N)< \ldots <W(Q_{N-1}^N)$.

In the NR system, under specific conditions such as when 18<=polar code information size<=25, parity check bits are generated to improve performance (e.g., block error rate (BLER)) when using polar codes. Here, a polar code information size K refers to the number of information bits encoded through polar coding. For example, the sum of code block bits and code block CRC bit(s) may be equivalent to the polar code information size.

Figure 12:
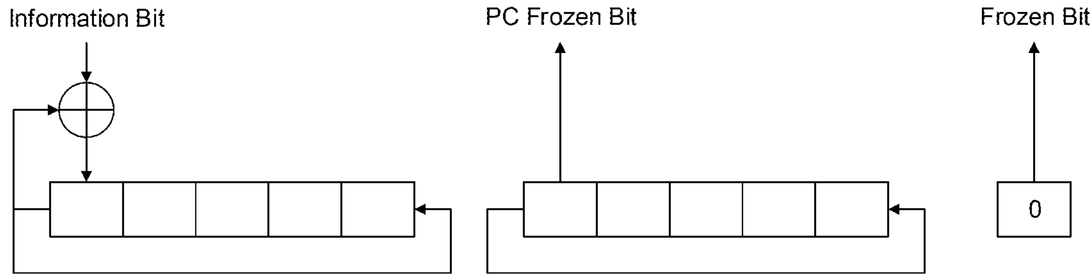
FIG. 12 illustrates a method of generating parity check bit(s) used in polar codes.

FIG. 12 illustrates a method of generating parity check bit(s) used in polar codes.

In some implementations, a parity check (PC) polar code may be used. The PC polar code refers to a polar code that places PC bit(s) generated using a portion of a data block (i.e., information block) in the input of a polar encoder. According to the currently published NR specifications, the PC polar code may be used when the data block size K is within a range of 18<=K<=25. In this case, the number of PC bits is 3, and the PC bits may be generated using a 5-bit shift register as illustrated in FIG. 12. In FIG. 12, the 5-bit shift register, i.e., y[0], y[1], y[2], y[3], and y[4], are all initialized to 0. That is, PC bit(s) may be generated for a data block $[u_0, u_1, u_2, \ldots, u_{N-1}]$ as follows.

> The register is cyclically shifted to the left.

> If $u_i$ is an information bit, set $y[0]=(u_i \text{ XOR } y[0])$,

> If $u_i$ is a PC bit, set $u_i=y[0]$.

The generated PC bit(s) are assigned to input bit channels (i.e., the bit indices of the polar code) of the polar encoder as follows. When E−K+3>192, $n^{wm}_{PC}=1$, and when E−K+3<=192, $n^{wm}_{PC}=0$. In this case, if a set of bit indices for the PC bits is denoted as $Q^N_{PC}$, and if a set of bit indices for other PC bits among $Q^N_{PC}$ is denoted as $Q^N_{PC\_wm}$, the size of the set $Q^N_{PC}$ is $|Q^N_{PC}|=n_{PC}$, and the size of the set $Q^N_{PC\_wm}$ is $|Q^N_{PC\_wm}|=n^{wm}_{PC}$. According to the NR specifications (e.g., 3GPP TS 38.212 Rel-15), $Q^N_{PC}$ and $Q^N_{PC\_wm}$ may be calculated as follows. For a bit index j ranging from 0 to N−1 (i.e., j=0, 1, . . . , N−1), the j-th row of $G_N$ is denoted as $g_j$, and the row weight of $g_j$ is denoted as $w(g_j)$, where $w(g_j)$ is the count of ones within $g_j$. In this case, $(n_{PC}-n^{wm}_{PC})$ PC bits are placed on $(n_{PC}-n^{wm}_{PC})$ least reliable bit indices in $$\overline{Q}_I^N.$$

In addition, the remaining $n^{wm}_{PC}$ PC bits are placed on bit indices with the minimum row weight in $$\overline{Q}_I^N,$$

where $$\tilde{Q}_I^N$$

denotes $$(|\overline{Q}_I^N| - n_{PC})$$

most reliable bit indices. If there are more bit indices with the same minimum row weight in $$\tilde{Q}_I^N$$

than $n^{wm}_{PC}$, the remaining $n^{wm}_{PC}$ PC bits are placed on $n^{wm}_{PC}$ bit indices with the highest reliability and the minimum row weight in $$\tilde{Q}_I^N.$$

The input to polar encoding, $u=[u_0, u_1, u_2 \ldots u_{N-1}]$ may be generated according to Table 5 below.

TABLE 5

```
k = 0;
if n_PC > 0
  y_0 = 0; y_1 = 0; y_2 = 0; y_3 = 0; y_4 = 0;
  for n = 0 to N − 1
    y_1 = y_0; y_0 = y_1; y_1 = y_2; y_2 = y_3; y_3 = y_4; y_4 = y_i;
    if n ∈ \overline{Q}_I^N
      if n ∈ Q_PC^N
        u_n = y_0;
      else
        u_n = c'_k;
        k = k + 1;
        y_0 = y_0 ⊕ u_n;
      end if
    else
      u_n = 0;
    end if
  end for
else
  for n = 0 to N − 1
    if n ∈ \overline{Q}_I^N
      u_n = c_k;
      k = k + 1;
    else
      u_n = 0;
    end if
  end for
end if
```

The output after encoding, $d=[d_0\ d_1\ d_2\ d_3 \ldots d_{N-1}]$ is obtained from $d=uG_N$, and the encoding is performed by GF(2).

Figure 13:
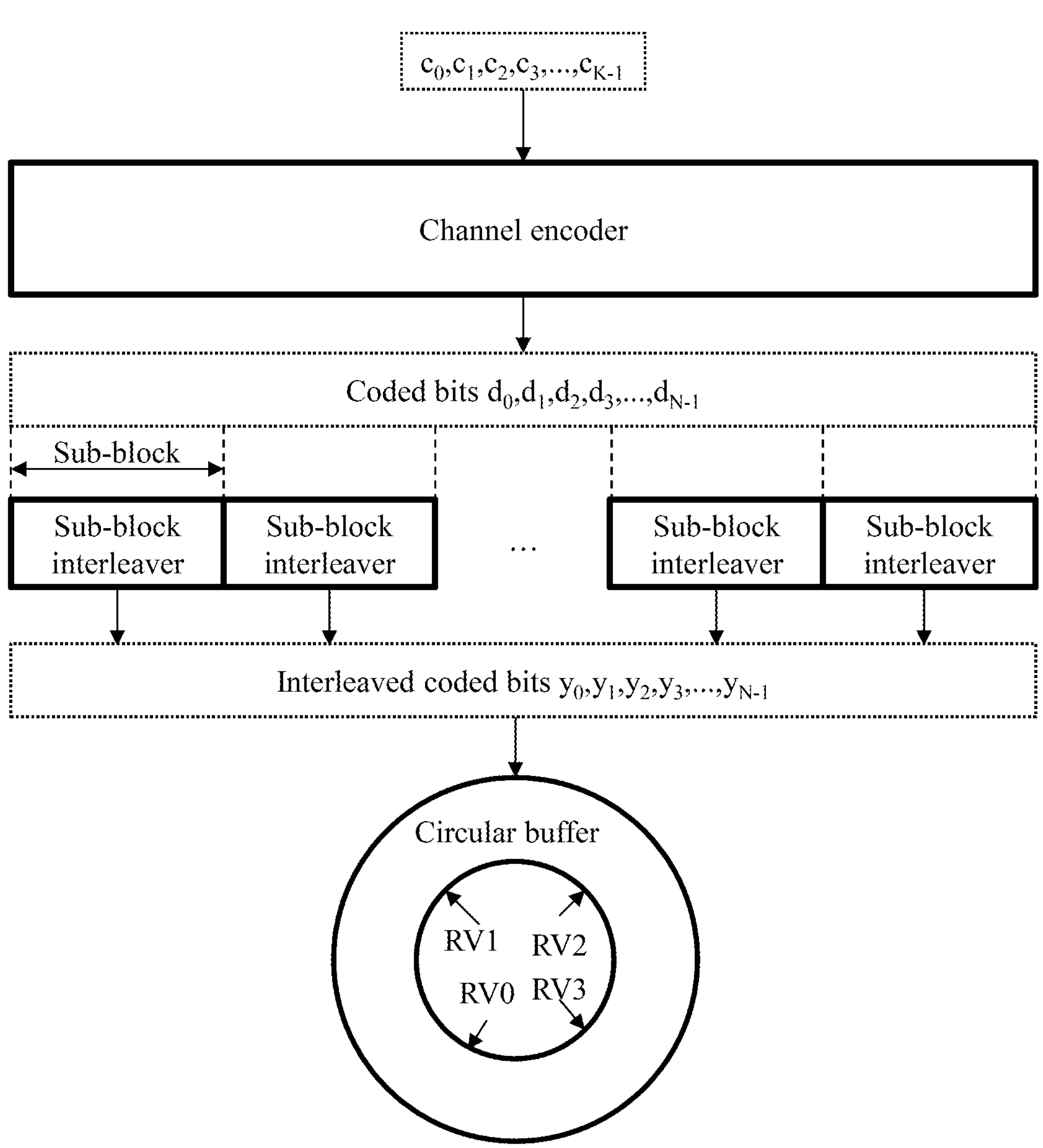
FIG. 13 is a diagram to explain a rate matching process according to some implementations of the present disclosure.

FIG. 13 is a diagram to explain a rate matching process according to some implementations of the present disclosure.

In some implementations, rate matching is performed after channel coding. In the NR specifications, rate matching for polar codes is defined for each code block, and the rate matching consists of sub-block interleaving, bit selection, and bit interleaving. In this specification, an input bit sequence before rate matching may be denoted as $d_0, d_1, d_2, d_3, \ldots, d_{N-1}$, and an output bit sequence after rate matching may be denoted as $f_0, f_1, f_2, f_3, \ldots, f_{E-1}$. Bits input to a sub-block interleaver are coded bits $d_0, d_1, d_2, d_3, \ldots, d_{N-1}$. The coded bits $d_0, d_1, d_2, d_3, \ldots, d_{N-1}$ may be divided into 32 sub-blocks. Bits output from the sub-block interleaver may be denoted as $y_0, y_1, y_2, y_3, \ldots, y_{N-1}$, which may be generated as follows: for n=0 to N−1: i=floor(32n/N); J(n)=P(i)*(N/32)+mod(n, N/32); $y_n=d_{J(n)}$, where a sub-block interleaver pattern P(i) is determined according to Table 6 below.

TABLE 6

| i | P(i) | i | P(i) | i | P(i) | i | P(i) | i | P(i) | i | P(i) | i | P(i) | i | P(i) |
|---|---|---|---|---|---|---|---|---|---|---|---|---|---|---|---|
| 0 | 0 | 4 | 3 | 8 | 8 | 12 | 10 | 16 | 12 | 20 | 14 | 24 | 24 | 28 | 27 |
| 1 | 1 | 5 | 5 | 9 | 16 | 13 | 18 | 17 | 20 | 21 | 22 | 25 | 25 | 29 | 29 |
| 2 | 2 | 6 | 6 | 10 | 9 | 14 | 11 | 18 | 13 | 22 | 15 | 26 | 26 | 30 | 30 |
| 3 | 4 | 7 | 7 | 11 | 17 | 15 | 19 | 19 | 21 | 23 | 23 | 27 | 28 | 31 | 31 |

$G_N=(G_2)^{\otimes n}$ denotes the n-th Kronecker power of the matrix $G_2$, where N is $2^n$ and $G_2$ is the same as the basic matrix F shown in FIG. 6(*b*).

In some implementations, the bit sequence $y_0$, $y_1$, $y_2$, $y_3$, . . . , $y_{N-1}$ after the sub-block interleaver is written into a cyclic buffer of length N. If the rate matching output sequence length is denoted as E, a bit selection output bit sequence ex (where k=0, 1, 2, . . . , E−1) may be generated as follows.

TABLE 7

```
if E ≥ N   -- repetition
  for k = 0 to E −1
    e_k = y_mod(k,N) ;
  end for
else
  if K / E ≤ 7 / 16   -- puncturing
    for k = 0 to E −1
      e_k = y_k+N−E ;
    end for
  else   -- shortening
    for k = 0 to E −1
      e_k = y_k ;
    end for
  end if
end if
```

Puncturing or shortening is a technique where some of the encoded bits are not transmitted when resources allocated for transmission are not large enough to accommodate all the encoded bits. Repetition is a technique where some of the encoded bits are duplicated and transmitted when resources allocated for transmission are large enough to accommodate all the encoded bits.

Depending on the type of transport channel or control information or depending on the channel coding scheme, a bit sequence $e_0, e_1, e_2, \ldots, e_{E-1}$ may be interleaved into the bit sequence $f_0, f_1, f_2, f_3, \ldots, f_{E-1}$. For example, in the case of polar coding for UCI, the bit sequence $e_0, e_1, e_2, \ldots, C_{E-1}$ may be interleaved into the bit sequence $f_0, f_1, f_2, f_3, \ldots, f_{E-1}$ as follows.

TABLE 8

```
  Denote 7 as the smallest integer such that T(T + 1)/2 ≥ E ;
  k = 0 ;
  for i = 0 to T −1
    for j = 0 to T −1−i
      if k < E
        v_i,j = e_k ;
      else
        v_i,j =< NULL > ;
      end if
      k = k + 1 ;
    end for
  end for
  k = 0 ;
  for j = 0 to T − 1
    for i = 0 to T −1 − j
      if v_i,j ≠< NULL >
        f_k = v_i,j;
        k = k + 1
      end if
    end for
  end for
else
  for i = 0 to E − 1
    f_i = e_i ;
  end for
```

A set of bit indices in the polar sequence $Q_0^{N-1}$ is denoted as $$\overline{Q}_I^N,$$

and a set of other bit indices in the polar sequence $Q_0^{N-1}$ is denoted as $$\overline{Q}_F^N,$$

where $$|\overline{Q}_I^N| = K + n_{PC},\ |\overline{Q}_F^N| = N - |\overline{Q}_I^N|,$$

and $n_{PC}$ is the number of PC bits. In the present disclosure, |S| denotes the number of elements in a set S.

$$\overline{Q}_I^N \text{ and } \overline{Q}_F^N$$

are given as follows.

TABLE 9

$\overline{Q}_{F,tmp}^N = \emptyset$ if E < N
  if K/E ≤ 7/16 -- puncturing
    for n = 0 to N − E − 1

$\overline{Q}_{F,tmp}^N = \overline{Q}_{F,tmp}^N \cup \{J(n)\};$ end for
    if E ≥ 3N/4

$\overline{Q}_{F,tmp}^N = \overline{Q}_{F,tmp}^N \cup \{0, 1, \ldots, \lceil 3N/4 - E/2 \rceil - 1\};$ else $\overline{Q}_{F,tmp}^N = \overline{Q}_{F,tmp}^N \cup \{0, 1, \ldots, \lceil 9N/16 - E/4 \rceil - 1\};$ end if
  else -- shortening
    for n = E to N − 1

$\overline{Q}_{F,tmp}^N = \overline{Q}_{F,tmp}^N \cup \{J(n)\};$ end for
  end if
end if $\overline{Q}_{I,tmp}^N = Q_0^{N-1} \backslash \overline{Q}_{F,tmp}^N;$ $\overline{Q}_I^N$ comprises $(K + n_{PC})$ most reliable bit indices in $\overline{Q}_{I,tmp}^N$;

$\overline{Q}_F^N = Q_0^{N-1} \backslash \overline{Q}_I^N;$

In the present disclosure, A\B denotes the difference of set B from set A, i.e., A—B. In other words, A\B refers to a set of all elements of set A that do not belong to set B.

Referring to Table 9, rate matching based on puncturing or shortening may involve setting input bit channels to frozen bits (see $$\overline{Q}^{N}_{F,tmp} = \overline{Q}^{N}_{F,tmp}$$

∪{J(n)} in Table 9).

Hybrid Automatic Repeat Request (HARQ) is a technique that combines forward error correction (FEC) and automatic repeat request (ARQ). In other words, a transmitter transmits all or some of the coded bits encoded based on FEC, and a receiver detects errors in the received data and transmits a HARQ-ACK signal to the transmitter, which includes an acknowledgment (ACK) or a negative acknowledgment (NACK). If there are no errors in the received data, the transmitter transmits new data. However, if there are errors in the received data, the transmitter retransmits the corresponding data block. The receiver combines the retransmitted data block with the previously received data block and performs decoding to detect errors. This process may continue until errors are no longer detected or until a predetermined number of attempts is reached. The retransmitted data block may vary depending on the combining method for decoding.

- Chase combining: The originally transmitted coded bit(s) are transmitted upon retransmission. Chase combining may reduce error probability based on the power gain obtained when retransmitted data blocks are decoded.
- Incremental redundancy (IR): Coded bit(s) that are not the same as the originally transmitted coded bit(s) are transmitted upon retransmission. IR may reduce error probability based on the coding gain obtained when retransmitted data blocks are decoded. In general, chase combining may be interpreted as a special form of IR.

There are various types of HARQ schemes. For example, the HARQ schemes may be broadly categorized into synchronous HARQ schemes and asynchronous HARQ schemes based on the timing of retransmission. In addition, the HARQ schemes may be categorized into channel-adaptive schemes and channel-non-adaptive schemes depending on whether the channel state is reflected in the amount of resources to be used for retransmission.

In the case of the synchronous HARQ scheme, if the initial transmission fails, subsequent retransmission occur at a timing determined by the system. For example, assuming that retransmission occurs every fourth time unit after the initial transmission fails, there is no need for the transmitter to inform the receiver of the timing of retransmission or for the receiver to inform the transmitter of the timing of retransmission because the timing is already determined between the transmitter and receiver. However, in the synchronous HARQ scheme, if the data transmitting side receives a NACK message, the data transmitting side retransmits a frame, for example, every fourth time unit, until receiving an ACK message. On the other hand, in the case of the asynchronous HARQ scheme, the timing of retransmission may be newly scheduled or provided through additional signaling (from the transmitter to the receiver or from the receiver to the transmitter). In the asynchronous HARQ scheme, the timing at which a previously failed frame is retransmitted varies depending on various factors such as channel states.

In the case of the channel-non-adaptive HARQ scheme, the frame modulation, the number of used RBs, adaptive modulation and coding (AMC), etc. for retransmission are determined to be the same as those determined for the initial transmission. In contrast, in the case of the channel-adaptive HARQ scheme, these parameters vary depending on the channel state. For example, in the channel-non-adaptive HARQ scheme, the transmitting side uses 6 RBs to transmit data during the initial transmission and also use 6 RBs for retransmission. On the other hand, in the channel-adaptive HARQ scheme, even if the transmitting side uses 6 RBs during the initial transmission, the transmitting side may use more or fewer RBs for retransmission based on the channel state.

According to the above classification, four different types of HARQ schemes may be used, but asynchronous and channel-adaptive HARQ schemes and synchronous and channel-non-adaptive HARQ schemes are commonly used. The asynchronous and channel-adaptive HARQ scheme may maximize retransmission efficiency by adaptively varying the retransmission timing and the amount of resources used based on the channel state. However, the asynchronous and channel-adaptive HARQ scheme may increase overhead, and thus, the asynchronous and channel-adaptive HARQ scheme is generally not considered for UL. On the other hand, the synchronous and channel-non-adaptive HARQ scheme has the advantage of minimal overhead because the timing and resource allocation for retransmission are predefined in the system. However, the synchronous and channel-non-adaptive HARQ scheme may when used in conditions with rapidly changing channel states. When the channel states changes rapidly, the retransmission efficiency of the synchronous and channel-non-adaptive HARQ scheme may significantly degrade.

In the case of HARQ operation, the receiver generates an ACK or NACK for a received or scheduled packet and provides the ACK or NACK to the transmitter. If the transmitter receives the NACK for transmission, the transmitter may retransmit the required packet. The bits read from a circular buffer and transmitted whenever retransmission is performed may vary depending on the position of a redundancy version (RV). Referring to FIG. 13, there are multiple (e.g., 4) RVs that define the starting point of the bits read from the circular buffer.

The circular buffer is a crucial component for rate matching, which allows for puncturing and/or repetition of coded bits. Referring to FIG. 13, coded bits or output bits after sub-block interleaving of the coded bits are sequentially written into the circular buffer for the mother code. The coded bits are read in order from a specific starting point within the circular buffer, which is determined by the RV points in the circular buffer.

In some scenarios, turbo codes or low density parity check (LDPC) codes are applied to data channels. Due to constraints on the size of the circular buffer in the transmitter or receiver, limited buffer rate matching (LBRM) is performed, where a portion of a codeword is not stored in the circular buffer of the transmitter. The LBRM involves excluding some coded bits from a transmission buffer based on a mother code rate. That is, the LBRM physically increases the mother code rate, which may lead to a decrease in the memory complexity of the receiver and a decrease in processing overhead. Eventually, the LBRM may yield implementation benefits. However, the increase in the mother code rate may lead to performance degradation. Typically, a transport block size (TBS) affected by the LBRM varies depending on the number of coded bits stored in the circular buffer defined by the LBRM. For example, if the number of coded bits stored in the circular buffer is capable of supporting the mother code rate when the LBRM is not applied, it may be desirable to apply full buffer rate matching for a corresponding TBS. In general, the code rate supported for the maximum TBS is equivalent to the mother code rate changed by the LBRM.

In some implementations of the present disclosure, a circular buffer size $N_{IR}$ may be determined based on a TBS, the number of code blocks C, and a code rate predefined or preconfigured for LBRM $R_{LBRM}$. For example, in some implementations, for UL LBRM, the circular buffer size $N_{IR}$ may be determined by $N_{IR}$=floor {TBS/(C*$R_{LBRM}$)}.

When the LBRM is applied, the circular buffer size assumed to indicate an RV during HARQ operation is also reduced, resulting in a change in the position of the RV during the HARQ operation. In some implementations, for instance, the position of the RV may be scaled in proportion to the decrease in the circular buffer.

In the current 3GPP-based wireless systems, both turbo codes and LDPC codes are applied to channel coding of data channels. The turbo codes and LDPC codes are types of systematic codes. That is, a codeword consists of information bits and parity bits. For example, a codeword obtained from channel coding of an input sequence $c_0, c_1, \ldots, C_{K-1}$ based on the turbo codes or LDPC codes includes the input sequence $c_0, C_1, \ldots, C_{K-1}$ as a part of the codeword. Therefore, when the LBRM is performed for systematic codes such as the turbo codes and LDPC codes, the transmitter may exclude parity bit(s) from the bits to be stored in the transmission buffer.

In the current 3GPP-based wireless systems, polar codes are primarily used for channel coding of transport channels or control information with a small number of bits such as a BCH, DCI, UCI, and so on. Since the maximum length of a codeword obtained from polar encoding is limited to 1024, there is a low likelihood that the codeword obtained from polar encoding exceeds buffer size constraints that the transmitter or receiver is capable of supporting. Therefore, in the current 3GPP-based wireless systems, the application of the LBRM to polar codes has not been considered. However, as wireless communication technology advances and the demands for diverse services increase, it may be considered that the polar codes are applied to data channels (e.g., UL-SCH, DL-SCH, etc.). In the future, if the polar codes are applied to the data channels, there may be situations where the length of the codeword exceeds the length of the circular buffer that the transmitter is capable of supporting. Since the polar codes are non-systematic codes, it is difficult to distinguish between the information bits and parity bits in the codeword, unlike systematic codes such as the turbo codes and LDPC codes. In the future, to apply the LBRM to coded bits obtained from channel encoding based on the polar codes, there is a need for a method of determining portions of a codeword to be removed from the transmission buffer, that is, coded bit(s) that will not be written to the circular buffer. Hereinafter, implementations of the present disclosure for supporting the LBRM for the polar codes will be described.

Generally, the LBRM is performed because the maximum size of the transmission (transmit) buffer in the transmitter is smaller than the length of the codeword, due to buffer constraints of the transmitter or receiver. Accordingly, in some implementations of the present disclosure, the LBRM is defined based on a maximum mother code size. For example, in some implementations of the present disclosure, for polar codes generated with a mother code size smaller than the maximum mother code size, the transmitter performs full buffer rate matching (FBRM), and the receiver decodes signals received from the transmitter by assuming that the transmitter performs the FBRM. Herein, the FBRM refers to rate matching where there are no coded bits removed from the transmission buffer, that is, there are no coded bits not stored in the transmission buffer.

For the sake of clarity in the explanation, the following parameters are defined:

$N_{max}$: Maximum mother code size $N_{IR}$: Buffer size after LBRM

K: Information size

E: Rate matching output sequence length $N_{IR}$ may be considered as the number of coded bits stored in the circular buffer, and in the case of LBRM, $N_{IR}$ may be equal to, for example, the circular buffer size. In some implementations, E may be determined based on the amount of resources scheduled by the BS, a modulation and coding scheme (MCS), and so on.

Case 1

If a transmitter generates a codeword with a mother code size of $N_{max}$ during initial transmission, the mother code size does not increase in retransmission. Thus, if the total number of coded bits to be combined at a receiver exceeds $N_{IR}$, the transmitter repeats transmission. To this end, one of the following methods may be used.

Figure 14:
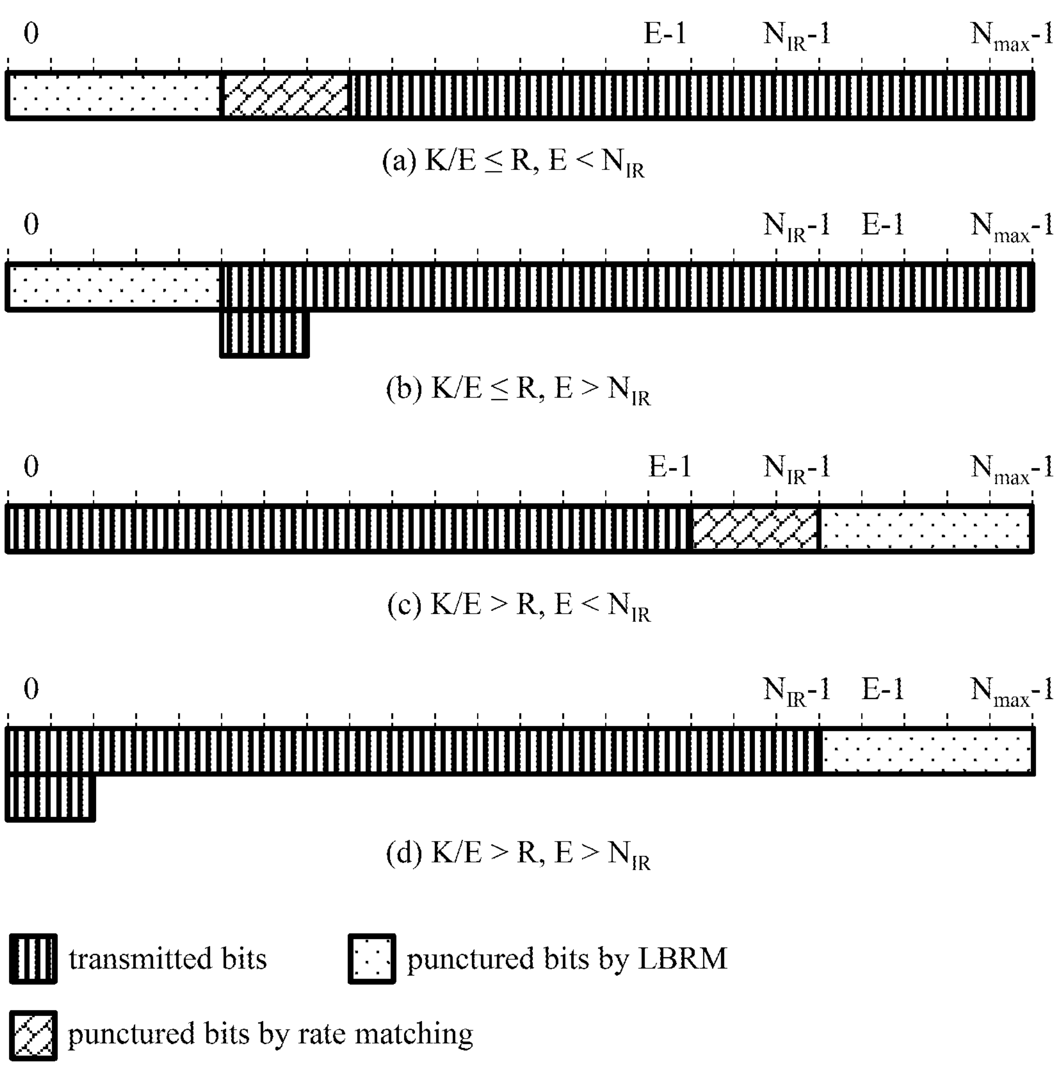
FIG. 14 illustrates examples of limited buffer rate matching (LBRM) according to some implementations of the present disclosure.

FIG. 14 illustrates examples of LBRM according to some implementations of the present disclosure.

Method 1_1: For LBRM, a transmitter changes bits to be removed among coded bits depending on a code rate, which is denoted as K/E, and stores the bits in a transmission buffer. For example, referring to FIGS. 14(*a*) and 14(*b*), when K/E<=R, the bits at bit positions of 0 to ($N_{MAX}$−$N_{IR}$−1) AMONG THE CODED BITS ARE REMOVED FROM THE TRANSMISSION BUFFER. REFERRING TO FIGS. 14(*c*) and 14(*d*), when K/E>R, the bits at bit positions of $N_{IR}$ to ($N_{max}$−1) among the coded bits are removed from the transmission buffer. In other words, according to some implementations of the present disclosure, in the LBRM, when K/E<=R, the last $N_{IR}$ bits among the coded bits are stored in the circular buffer, and when K/E>R, the first $N_{IR}$ bits among the coded bits are stored in the circular buffer, where R is a predefined or preconfigured code rate. In some implementations of the present disclosure, R may be defined by R=7/16.

In some implementations of the present disclosure, when a portion of the codeword is punctured or shortened by LBRM or general rate matching performed based on the rate matching output sequence length E, pre-freezing may be performed. Pre-freezing refers to setting input bit channels as frozen bits for rate matching involving puncturing or shortening. The reason for performing pre-freezing may be explained as follows. For example, assuming a mother code size of N=8, when an input is $u=(u_0, u_1, \ldots, u_7)$, a codeword is $c=(c_0, c_1, \ldots, c_7)$, and G is the polar code generator matrix defined in Equation 12, c may be obtained by c=uG. Puncturing or shortening means that a specific portion of the codeword is not transmitted. Specifically, puncturing is a method of not transmitting bit(s) corresponding to lower index(s) among the coded bit indices, and shortening is a method of not transmitting bit(s) corresponding to higher index(s) among the coded bit indices. For example, for the mother code size of N=8, if one-bit puncturing is performed, $c_0$ is not transmitted, and if one-bit shortening is performed, $c_7$ is not transmitted. This is equivalent to generating the codeword with a new generator matrix obtained by removing the first or last column of the original generator matrix. For the one-bit puncturing, the new generator matrix has the first row filled with zeros, which means that input bit $u_0$ is not represented in the codeword. Thus, it is difficult for the receiving side to decode $u_0$. Therefore, the transmitting side needs to set $u_0$ as a frozen bit, that is, allocate no information to $u_0$. On the other hand, for the one-bit shortening, the last row of the new generator matrix becomes all ones, which means that the last row interferes with all coded bits. Thus, $u_7$ may be set as a frozen bit to reduce interference and improve performance. Accordingly, when rate matching involving puncturing or shortening is performed, it is desirable to freeze specific input bit channel(s).

In some implementations, when $K/E<=R$ and $E<N_{IR}$ (refer to FIG. 14(*a*)), the positions of pre-frozen bits among (input) bit positions of a polar encoder may be determined by Equation 14 below.

$$\begin{cases} \left\{0, 1, \ldots, \left\lceil \frac{3N_{max}}{4} - \frac{E}{2} \right\rceil - 1\right\} & \text{if } E > 3N_{max}/4 \\ \left\{0, 1, \ldots, \left\lceil \frac{9N_{max}}{16} - \frac{E}{4} \right\rceil - 1\right\} & \text{otherwise} \end{cases} \quad \text{Equation 14}$$

In some implementations, when $K/E<=R$ and $E>N_{IR}$ (refer to FIG. 14(*b*)), the positions of the pre-frozen bits among the (input) bit positions of the polar encoder may be determined by Equation 15 below.

$$\begin{cases} \left\{0, 1, \ldots, \left\lceil \frac{3N_{max}}{4} - \frac{N_{IR}}{2} \right\rceil - 1\right\} & \text{if } E > 3N_{max}/4 \\ \left\{0, 1, \ldots, \left\lceil \frac{9N_{max}}{16} - \frac{N_{IR}}{4} \right\rceil - 1\right\} & \text{otherwise} \end{cases} \quad \text{Equation 15}$$

In some implementations, when $K/E>R$ and $E<N_{IR}$ (refer to FIG. 14(*c*)), the bits at bit positions of E to $(N_{max}-1)$ among the (input) bit positions of the polar encoder are frozen.

In some implementations, when $K/E>R$ and $E>N_{IR}$ (refer to FIG. 14(*d*)), the bits at bit positions of $N_{IR}$ to $(N_{max}-1)$ among the (input) bit positions of the polar encoder are frozen.

For high code rates, information bits are placed at bit positions with relatively higher bit indices in a polar code. Due to the structure of the polar code, the information bits placed at the bit positions with higher bit indices have significant impacts on multiple coded bits. In other words, from the perspective of other information bits, the information bits placed at the bit positions with higher bit indices are more likely to cause interference to the other information bits. In general, the bit positions with higher bit indices in the polar code are more reliable than those with lower bit indices. LBRM based on shortening may reduce interference to other information bits but decrease the reliability of a corresponding bit channel by freezing the bit positions with higher bit indices. As the code rate increases, the interference cancellation effect is relatively improved, and as the code rate decreases, information bits are allocated to bit positions with lower reliability, leading to a relatively larger degradation in the BLER. Thus, for low code rates, if the LBRM based on shortening is applied, the bit positions with higher bit indices among the bit positions in the polar code may be frozen. As a result, the BLER degradation may surpass the interference cancellation effect, resulting in performance degradation. According to Method 1_1, for low code rates, LBRM based on puncturing is performed. Thus, information bits are placed in bit positions with higher reliability, thereby increasing the BLER performance. For high code rates, the LBRM based on shortening is performed, and thus, the bit positions with higher bit indices are frozen, thereby achieving performance gains based on the interference cancellation effect.

Figure 15:
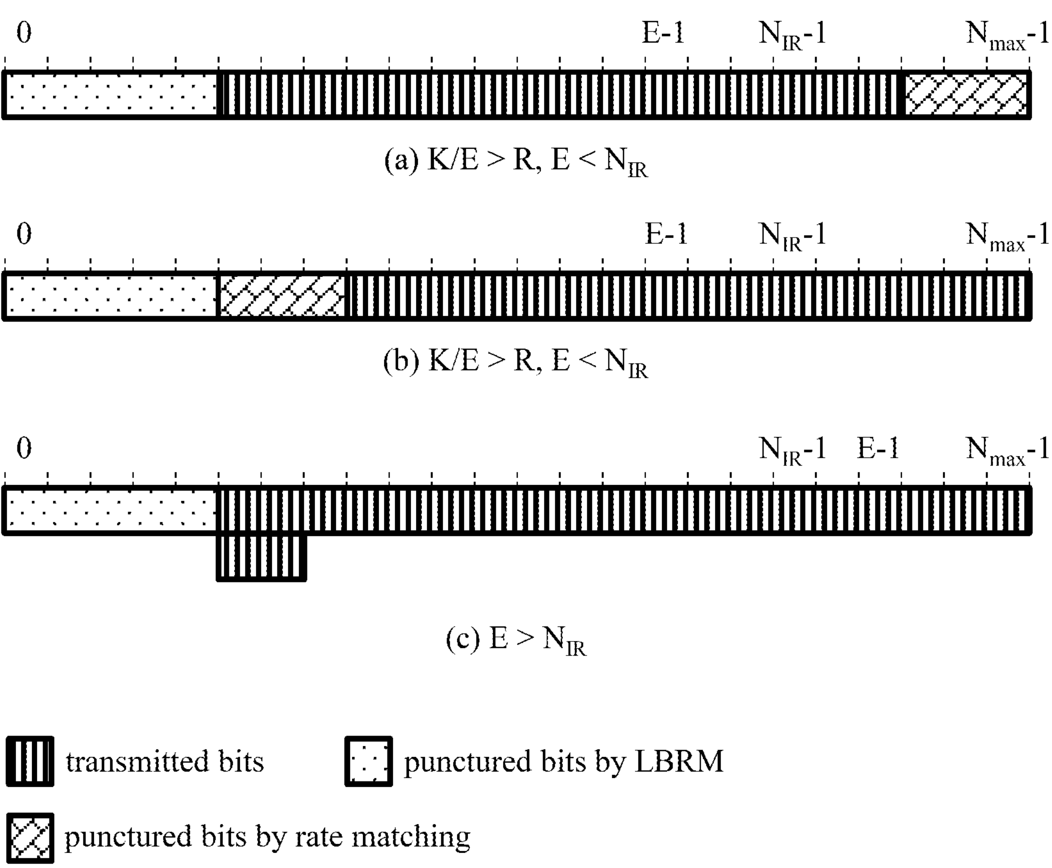
FIG. 15 illustrates other examples of LBRM according to some implementations of the present disclosure.

FIG. 15 illustrates other examples of LBRM according to some implementations of the present disclosure.

Method 1_2: A transmitter removes bit(s) with lower bit index(s) among bits constituting a codeword and stores the bit(s) in a transmission buffer. In this case, after LBRM, rate matching may be performed depending on a code rate K/E.

Method 1_2-1: When $K/E>R$ and $E<N_{IR}$, the bit(s) at bit position(s) of 0 to $(N_{IR}-1)$ and the bit(s) at bit position(s) of $(N_{max}-(E-N_{IR})-1)$ to $(N_{max}-1)$ among the bits of the codeword are removed (refer to FIG. 15(*a*)).

Method 1_2-2: When $K/E>R$ and $E<N_{IR}$, the bit(s) at bit position(s) of 0 to $(N_{max}-E-1)$ among the bits of the codeword are removed (refer to FIG. 15(*b*)).

When $K/E<=7/16$ and $E<N_{IR}$, LBRM and (general) rate matching are performed in the same way as described in Method 1_2-1.

When $E>N_{IR}$, the rate matching is performed by repeating first $(E-N_{IR})$ bits among bits after the LBRM, i.e., bits at $N_{IR}$ to $(N_{max}-1)$ (refer to FIG. 15(*c*)). If $E>2N_{IR}$, the bits after the LBRM are cyclically repeated until the length of a sequence after the (general) rate matching becomes E.

In FIG. 15(*a*), the positions of pre-frozen bits of a polar encoder may be determined by Equation 16 below.

$$\begin{cases} \left\{0, 1, \ldots, \max\left(\left\lceil \frac{3N_{max}}{4} - \frac{N_{IR}}{2} \right\rceil - 1, N_{max} - N_{IR}\right)\right\} \cup \{N_{IR}, \ldots, N_{max}-1\}\} & \text{if } E > 3N_{max}/4 \\ \left\{0, 1, \ldots, \max\left(\left\lceil \frac{9N_{max}}{16} - \frac{N_{IR}}{4} \right\rceil - 1, N_{max} - N_{IR}\right)\right\} \cup \{N_{IR}, \ldots, N_{max}-1\}\} & \text{otherwise} \end{cases} \quad \text{Equation 16}$$

In FIG. 15(*b*), the positions of pre-frozen bits of a polar encoder may be determined by Equation 17 below.

$$\begin{cases} \left\{0, 1, \ldots, \max\left(\left\lceil \frac{3N_{max}}{4} - \frac{E}{2} \right\rceil - 1, N_{max} - N_{IR}\right)\right\} & \text{if } E > 3N_{max}/4 \\ \left\{0, 1, \ldots, \max\left(\left\lceil \frac{9N_{max}}{16} - \frac{E}{4} \right\rceil - 1, N_{max} - N_{IR}\right)\right\} & \text{otherwise} \end{cases} \quad \text{Equation 17}$$

In FIG. 15(*c*), the positions of pre-frozen bits of a polar encoder may be determined by Equation 17 above.

Figure 16:
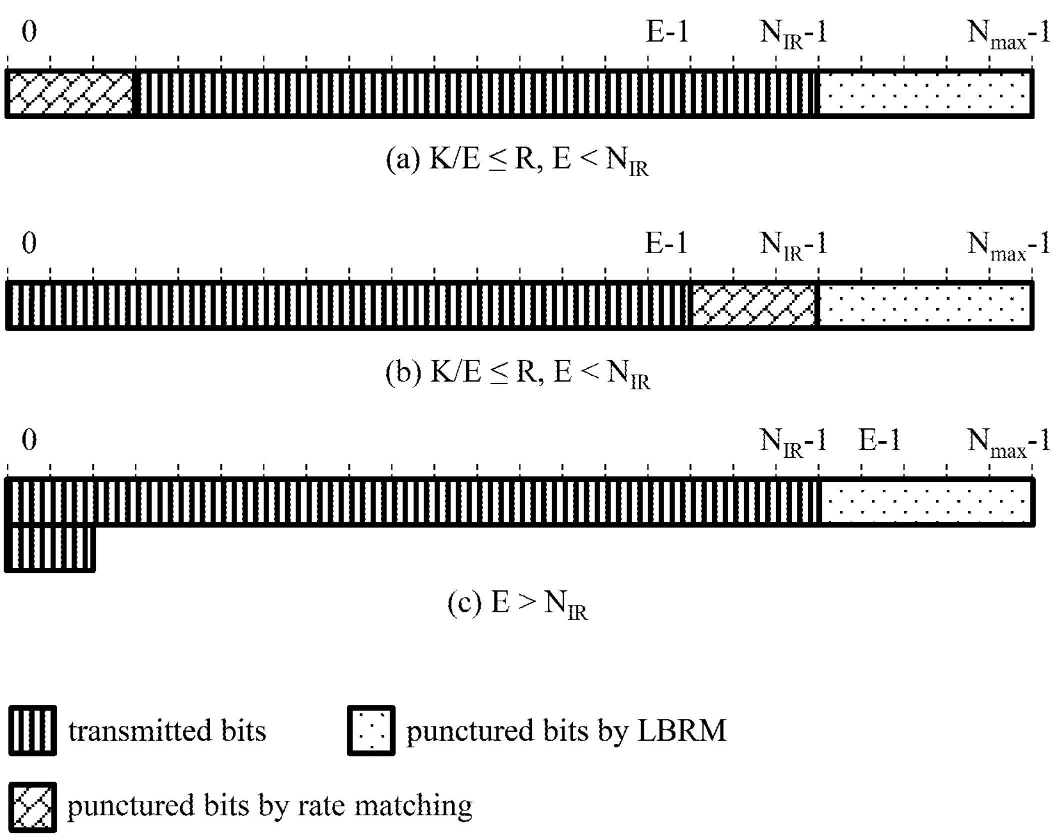
FIG. 16 illustrates further examples of LBRM according to some implementations of the present disclosure.

FIG. 16 illustrates further examples of LBRM according to some implementations of the present disclosure.

Method 1_3: A transmitter removes bit(s) with higher bit index(s) among bits constituting a codeword and stores the bit(s) in a transmission buffer. In this case, after LBRM, rate matching may be performed depending on a code rate K/E.

Method 1_3-1: When K/E<=R and $E<N_{IR}$, the bit(s) at bit position(s) of $(N_{max}-N_{IR})$ to $(N_{max}-1)$ and the bit(s) at bit position(s) of 0 to $(E-N_{IR}-1)$ among the bits of the codeword are removed (refer to FIG. 16(*a*)).

Method 1_3-2: When K/E<=R and $E<N_{IR}$, the bit(s) at bit position(s) of $(N_{max}-E)$ to $(N_{max}-1)$ among the bits of the codeword are removed (refer to FIG. 16(*b*)).

When K/E>7/16 and $E<N_{IR}$, LBRM and (general) rate matching are performed in the same way as described in Method 1_3-2.

When $E>N_{IR}$, the rate matching is performed by repeating first $(E-N_{IR})$ bits among bits after the LBRM, i.e., bits at 0 to $(N_{IR}-1)$ (refer to FIG. 16(*c*)). If $E>2N_{IR}$, the bits after the LBRM are cyclically repeated until the length of a sequence after the (general) rate matching becomes E.

In FIG. 16(*a*), the positions of pre-frozen bits of a polar encoder may be determined by Equation 18 below.

Equation 18

$$\begin{cases} \left\{0, 1, \ldots, \max\left(\left\lceil \frac{3N_{max}}{4} - \frac{N_{IR}}{2} \right\rceil - 1, N_{max} - N_{IR}\right)\right\} \cup \{N_{IR}, \ldots, N_{max} - 1\}\Big\} & \text{if } E > 3N_{max}/4 \\ \left\{0, 1, \ldots, \max\left(\left\lceil \frac{9N_{max}}{16} - \frac{N_{IR}}{4} \right\rceil - 1, N_{max} - N_{IR}\right)\right\} \cup \{N_{IR}, \ldots, N_{max} - 1\}\Big\} & \text{otherwise} \end{cases}$$

In FIG. 16(*b*), the bit(s) at bit position(s) of E to $(N_{max}-1)$ among the bit positions of the polar encoder are set to frozen bit(s). In FIG. 16(*c*), the input bit(s) at bit position(s) of $N_{IR}$ to $(N_{max}-1)$ among the bit positions of the polar encoder are frozen.

Case 2

If a transmitter generates a codeword with a mother code size smaller than $N_{max}$ during initial transmission, and if the transmitter generates a codeword with a mother code size larger than the previous transmission during retransmission, one of the following methods may be used.

Method 2_1-1: LBRM is performed depending on rate matching used in initial transmission. For example, if a transmitter performs rate matching based on puncturing during the initial transmission, the transmitter may perform the LBRM as described in Method 1_2. If the transmitter performs rate matching based on shortening during the initial transmission, the transmitter may perform the LBRM as described in Method 1_3.

Method 2_1-2: Regardless of the rate matching used in the initial transmission, the LBRM is performed as described in Method 1_2.

Method 2_1-3: Regardless of the rate matching used in the initial transmission, the LBRM is performed as described in Method 1_3.

When LBRM is performed, the size of a transmission buffer, which is assumed to indicate an RV, decreases due to the LBRM. To address this issue, according to some implementations of the present disclosure, the following may be considered when indicating the RV.

Method 2_2-1: The RV position (i.e., the starting position of the RV) is scaled based on the reduced buffer size. For example, in FBRM with $N_{max}$=1024, when the starting positions of RVs are specified as {0, 256, 512, 768}, if LBRM with $N_{IR}$=896 is applied, new RV positions may be specified as {0, 224, 448, 672}. In some implementations, the RV positions on a circular buffer for FBRM may be defined in relevant specifications. Alternatively, in some implementations, the BS may configure to the UE the RV positions on the circular buffer for FBRM.

Method 2_2-2: If the reduced buffer size is greater than 75% of $N_{max}$, the same RV positions are specified regardless of the reduced buffer size. For example, in FBRM with $N_{max}$=1024, when the RV positions are specified as {0, 256, 512, 768}, if LBRM with $N_{IR}$=896 is applied, new RV positions may also be specified as {0, 256, 512, 768}.

In some implementations of the present disclosure, signaling for LBRM may be performed in various ways. In some implementations, DL LBRM may be defined based on UE categories. Considering that the DL LBRM is related to UE implementation, the UE implementation may be facilitated by defining LBRM parameters based on UE capabilities. For UL, LBRM is related to BS implementation. Typically, the BS implementation may have more flexibility in terms of the area or cost of a modem chip, compared to the UE implementation. Therefore, in some implementations of the present disclosure, whether the UL LBRM is applied may be configured by the BS to the UE through RRC signaling. In this case, when changing whether to apply the LBRM, the BS may configure to the UE default rate matching to be used during a transition period, which is related to the application of the LBRM between the transmitting side and the receiving side.

In some implementations of the present disclosure, polar codes may be applied to data channels even when the buffer size is limited.

Figure 17:
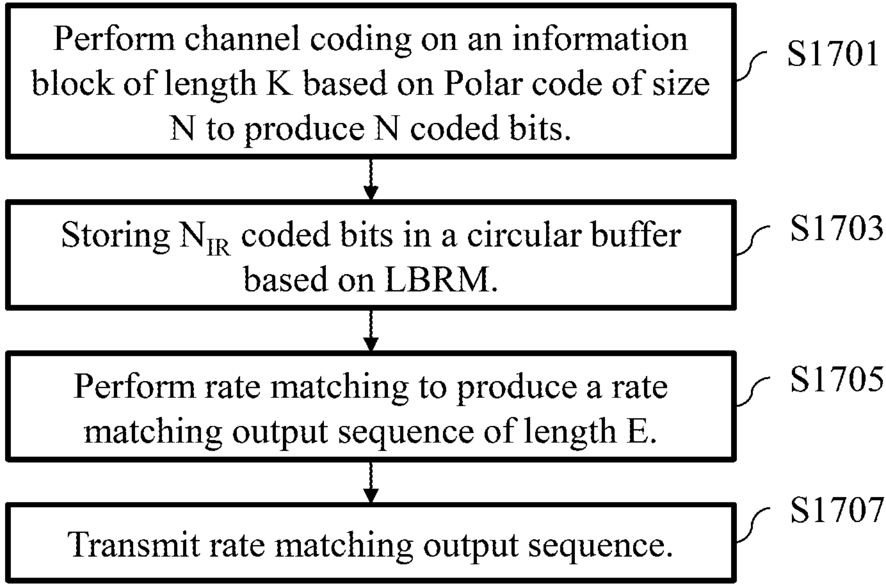
FIG. 17 illustrates a channel encoding process according to some implementations of the present disclosure.

FIG. 17 illustrates a channel encoding process according to some implementations of the present disclosure.

A communication device or encoder may perform operations related to channel encoding according to some implementations of the present disclosure. The communication device may include: at least one transceiver; at least one processor; and at least one computer memory operably connected to the at least one processor and storing instructions that, when executed, cause the at least one processor to perform operations according to some implementations of the present disclosure. A processing device for the communication device or encoder may include: at least one processor; and at least one computer memory operably connected to the at least one processor and storing instructions that, when executed, cause the at least one processor to perform the operations according to some implementations of the present disclosure. A computer-readable (non-volatile) storage medium may store at least one computer program including instructions that, when executed by at least one processor, cause the at least one processor to perform the operations according to some implementations of the present disclosure. A computer program or computer program product may include instructions that are recorded in at least one computer-readable (non-volatile) storage medium and cause, when executed, (at least one processor) to perform the operations according to some implementations of the present disclosure. Referring to FIG. 17, for the communication device, decoder, processing device, computer-readable (non-volatile) storage medium, and/or computer program product, the operations may include: generating coded bits d_0, d_1, d_2, . . . , d_(N−1) by encoding an information block of length K based on a polar code of length N (S1701); performing LBRM to store the coded bits d_0, d_1, d_2, . . . , d_(N−1) in a circular buffer of length $N_{IR}$ (S1703), where N>$N_{IR}$; performing rate matching on the coded bits stored in the circular buffer to generate a rate matching output sequence of length E (S1705); and transmitting the rate matching output sequence (S1707). Performing the LBRM may include: i) puncturing (N−$N_{IR}$) coded bits among the coded bits d_0, d_1, d_2, . . . , d_(N−1) based on K/E<=R; and ii) shortening (N−$N_{IR}$) coded bits among the coded bits d_0, d_1, d_2, . . . , d_(N−1) based on K/E>R, where R is a predetermined value. Puncturing the (N−$N_{IR}$) coded bits may include excluding first (N−$N_{IR}$) coded bits among the coded bits d_0, d_1, d_2, . . . , d_N−1. In other words, puncturing the (N−$N_{IR}$) coded bits may include storing last $N_{IR}$ coded bits among the coded bits d_0, d_1, d_2, . . . , d_N−1 in the circular buffer. Shortening the (N−$N_{IR}$) coded bits may include excluding last (N−$N_{IR}$) coded bits among the coded bits d_0, d_1, d_2, . . . , d_N−1. In other words, shortening the (N−$N_{IR}$) coded bits may include storing first $N_{IR}$ coded bits among the coded bits d_0, d_1, d_2, . . . , d_N−1 in the circular buffer.

In some implementations, performing the rate matching may include performing puncturing to exclude first ($N_{IR}$−E) coded bits among the coded bits stored in the circular buffer based on K/E<=R and E<$N_{IR}$.

In some implementations, performing the rate matching may include performing shortening to exclude last ($N_{IR}$−E) coded bits among the coded bits stored in the circular buffer based on K/E>R and E<$N_{IR}$.

In some implementations, performing the rate matching may include cyclically repeating first (E−$N_{IR}$) coded bits among the coded bits stored in the circular buffer based on E>$N_{IR}$.

In some implementations, the operations may include freezing bit indices corresponding to coded bits d_0 to d(N−$N_{IR}$−1) among the coded bits d_0, d_1, d_2, . . . , d_(N−1) among N input bit indices of the polar code, based on K/E<=R.

In some implementations, the operations may include freezing bit indices corresponding to coded bits d_$N_{IR}$ to d(N−1) among the coded bits d_0, d_1, d_2, . . . , d_(N−1) among N input bit indices of the polar code, based on K/E>R.

Figure 18:
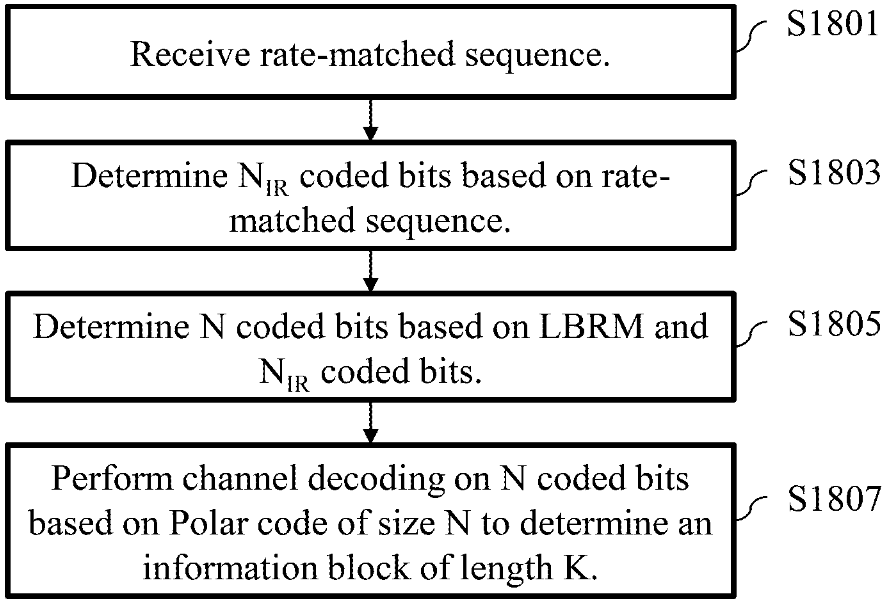
FIG. 18 illustrates a channel decoding process according to some implementations of the present disclosure.

FIG. 18 illustrates a channel decoding process according to some implementations of the present disclosure.

A communication device or decoder may perform operations related to channel decoding according to some implementations of the present disclosure. The communication device may include: at least one transceiver; at least one processor; and at least one computer memory operably connected to the at least one processor and storing instructions that, when executed, cause the at least one processor to perform operations according to some implementations of the present disclosure. A processing device for the communication device or decoder may include: at least one processor; and at least one computer memory operably connected to the at least one processor and storing instructions that, when executed, cause the at least one processor to perform the operations according to some implementations of the present disclosure. A computer-readable (non-volatile) storage medium may store at least one computer program including instructions that, when executed by at least one processor, cause the at least one processor to perform the operations according to some implementations of the present disclosure. A computer program or computer program product may include instructions that are recorded in at least one computer-readable (non-volatile) storage medium and cause, when executed, (at least one processor) to perform the operations according to some implementations of the present disclosure. Referring to FIG. 18, for the communication device, decoder, processing device, computer-readable (non-volatile) storage medium, and/or computer program product, the operations may include: receiving a rate-matched sequence of length E from another communication device (S1801); determining $N_{IR}$ coded bits based on the rate-matched sequence, where $N_{IR}$ is a length of a circular buffer of the other communication device (S1803); determining coded bits d_0, d_1, d_2, . . . , d_(N−1) based on limited buffer rate matching (LBRM) and the $N_{IR}$ coded bits (S1805); and decoding the coded bits d_0, d_1, d_2, . . . , d_(N−1) based on a polar code of length N to determine an information block of length K (S1807). The LBRM may include: i) puncturing (N−$N_{IR}$) coded bits among the coded bits d_0, d_1, d_2, . . . , d_(N−1) based on K/E<=R; and ii) shortening (N−$N_{IR}$) coded bits among the coded bits d_0, d_1, d_2, . . . , d_(N−1) based on K/E>R, where R is a predetermined value. Puncturing the (N−$N_{IR}$) coded bits may include excluding first (N−$N_{IR}$) coded bits among the coded bits d_0, d_1, d_2, . . . , d_N−1. Shortening the (N−$N_{IR}$) coded bits may include excluding last (N−$N_{IR}$) coded bits among the coded bits d_0, d_1, d_2, . . . , d_N−1.

The examples of the present disclosure as described above have been presented to enable any person of ordinary skill in the art to implement and practice the present disclosure. Although the present disclosure has been described with reference to the examples, those skilled in the art may make various modifications and variations in the example of the present disclosure. Thus, the present disclosure is not intended to be limited to the examples set for the herein, but is to be accorded the broadest scope consistent with the principles and features disclosed herein.

INDUSTRIAL APPLICABILITY

The implementations of the present disclosure may be used in a BS, a UE, or other equipment in a wireless communication system.

The invention claimed is:

1. A method performed by a communication device, the method comprising:

generating coded bits d_0, d_1, d_2, . . . , d_(N−1) by encoding an information block of length K based on a polar code of length N;

performing limited buffer rate matching (LBRM) to store $N_{IR}$ coded bits among the coded bits d_0, d_1, d_2, . . . , d_(N−1) into a circular buffer of length $N_{IR}$, where N is greater than $N_{IR}$;

performing rate matching on the $N_{IR}$ coded bits stored in the circular buffer to generate a rate matching output sequence of length E; and transmitting the rate matching output sequence of length E, wherein performing the rate matching on the $N_{IR}$ coded bits stored in the circular buffer comprises:

performing puncturing to exclude first ($N_{IR}$−E) coded bits among the $N_{IR}$ coded bits stored in the circular buffer to generate the rate matching output sequence of length E, based on K/E being smaller than or equal to R and E being smaller than $N_{IR}$, performing the rate matching comprises performing shortening to exclude last ($N_{IR}$−E) coded bits among the $N_{IR}$ coded bits stored in the circular buffer to generate the rate matching output sequence of length E, based on K/E being greater than R and E being smaller than $N_{IR}$, and obtaining E coded bits by i) obtaining the $N_{IR}$ coded bits starting from a first coded bit among the $N_{IR}$ coded bits stored in the circular buffer and ii) cyclically repeating ($E-N_{IR}$) coded bits starting from the first coded bit among the $N_{IR}$ coded bits stored in the circular buffer, based on E being equal to greater than $N_{IR}$.

2. The method of claim 1, comprising:

freezing bit indices corresponding to coded bits d_0 to d_($N-N_{IR}-1$) among the coded bits d_0, d_1, d_2, . . . , d_(N−1), among N input bit indices of the polar code, based on K/E being smaller than or equal to R.

3. The method of claim 1, comprising:

freezing bit indices corresponding to coded bits d_$N_{IR}$ to d_(N−1) among the coded bits d_0, d_1, d_2, . . . , d_(N−1), among N input bit indices of the polar code, based on K/E being greater than R.

4. The method of claim 1, wherein performing the LBRM to store the $N_{IR}$ coded bits among the coded bits d_0, d_1, d_2, . . . , d_(N−1) into the circular buffer of length $N_{IR}$ comprises:

i) puncturing ($N-N_{IR}$) coded bits among the coded bits d_0, d_1, d_2, . . . , d_(N−1) based on K/E being smaller than or equal to R; and ii) shortening ($N-N_{IR}$) coded bits among the coded bits d_0, d_1, d_2, . . . , d_(N−1) based on K/E being greater than R, where R is a predetermined value, wherein puncturing the ($N-N_{IR}$) coded bits comprises excluding first ($N-N_{IR}$) coded bits among the coded bits d_0, d_1, d_2, . . . , d_(N−1), and wherein shortening the ($N-N_{IR}$) coded bits comprises excluding last ($N-N_{IR}$) coded bits among the coded bits d_0, d_1, d_2, . . . , d_(N−1).

5. A communication device comprising:

at least one transceiver;

at least one processor; and at least one computer memory operably connected to the at least one processor and storing instructions that, when executed, cause the at least one processor to perform operations comprising:

generating coded bits d_0, d_1, d_2, . . . , d_(N−1) by encoding an information block of length K based on a polar code of length N;

performing limited buffer rate matching (LBRM) to store $N_{IR}$ coded bits among the coded bits d_0, d_1, d_2, . . . , d_(N−1) into a circular buffer of length $N_{IR}$, where N is greater than $N_{IR}$;

performing rate matching on the $N_{IR}$ coded bits stored in the circular buffer to generate a rate matching output sequence of length E; and transmitting the rate matching output sequence of length E, wherein performing the rate matching on the $N_{IR}$ coded bits stored in the circular buffer comprises:

performing puncturing to exclude first ($N_{IR}-E$) coded bits among the $N_{IR}$ coded bits stored in the circular buffer to generate the rate matching output sequence of length E, based on K/E being smaller than or equal to R and E being smaller than $N_{IR}$, performing the rate matching comprises performing shortening to exclude last ($N_{IR}-E$) coded bits among the $N_{IR}$ coded bits stored in the circular buffer to generate the rate matching output sequence of length E, based on K/E being greater than R and E being smaller than $N_{IR}$, and obtaining E coded bits by i) obtaining the $N_{IR}$ coded bits starting from a first coded bit among the $N_{IR}$ coded bits stored in the circular buffer and ii) cyclically repeating ($E-N_{IR}$) coded bits starting from the first coded bit among the $N_{IR}$ coded bits stored in the circular buffer, based on E being equal to greater than $N_{IR}$.

6. The communication device of claim 5, wherein performing the LBRM to store the $N_{IR}$ coded bits among the coded bits d_0, d_1, d_2, . . . , d_(N−1) into the circular buffer of length $N_{IR}$ comprises:

i) puncturing ($N-N_{IR}$) coded bits among the coded bits d_0, d_1, d_2, . . . , d_(N−1) based on K/E being smaller than or equal to R; and ii) shortening ($N-N_{IR}$) coded bits among the coded bits d_0, d_1, d_2, . . . , d_(N−1) based on K/E being greater than R, where R is a predetermined value, wherein puncturing the ($N-N_{IR}$) coded bits comprises excluding first ($N-N_{IR}$) coded bits among the coded bits d_0, d_1, d_2, . . . , d_(N−1), and wherein shortening the ($N-N_{IR}$) coded bits comprises excluding last ($N-N_{IR}$) coded bits among the coded bits d_0, d_1, d_2, . . . , d_(N−1).

7. The communication device of claim 5, wherein the operations comprise:

freezing bit indices corresponding to coded bits d_0 to d_($N-N_{IR}-1$) among the coded bits d_0, d_1, d_2, . . . , d_(N−1), among N input bit indices of the polar code, based on K/E being smaller than or equal to R.

8. The communication device of claim 5, wherein the operations comprise:

freezing bit indices corresponding to coded bits d_$N_{IR}$ to d (N−1) among the coded bits d_0, d_1, d_2, . . . , d_(N−1), among N input bit indices of the polar code, based on K/E being greater than R.

9. A communication device comprising:

at least one transceiver;

at least one processor; and at least one computer memory operably connected to the at least one processor and storing instructions that, when executed, cause the at least one processor to perform operations comprising:

receiving a rate matching output sequence of length E from another communication device;

determining $N_{IR}$ coded bits based on the rate matching output sequence of length E, where $N_{IR}$ is a length of a circular buffer of the other communication device;

determining coded bits d_0, d_1, d_2, . . . , d_(N−1) based on limited buffer rate matching (LBRM) and the $N_{IR}$ coded bits; and decoding the coded bits d_0, d_1, d_2, . . . , d_(N−1) based on a polar code of length N to determine an information block of length K, wherein the rate-matched sequence of length E is obtained by performing rate matching on the $N_{IR}$ coded bits stored in the circular buffer, and performing the rate matching on the $N_{IR}$ coded bits stored in the circular buffer comprises:

performing puncturing to exclude first ($N_{IR}-E$) coded bits among the $N_{IR}$ coded bits stored in the circular buffer to generate the rate matching output sequence of length E, based on K/E being smaller than or equal to R and E being smaller than $N_{IR}$, performing the rate matching comprises performing shortening to exclude last ($N_{IR}-E$) coded bits among the $N_{IR}$ coded bits stored in the circular buffer to generate the rate matching output sequence of length E, based on K/E being greater than R and E being smaller than $N_{IR}$, and obtaining E coded bits by i) obtaining the $N_{IR}$ coded bits starting from a first coded bit among the $N_{IR}$ coded bits stored in the circular buffer and ii) cyclically repeating $(E-N_{IR})$ coded bits starting from the first coded bit among the $N_{IR}$ coded bits stored in the circular buffer, based on E being equal to greater than $N_{IR}$.

10. The communication device of claim 9, wherein the LBRM is performed to store the $N_{IR}$ coded bits among the coded bits d_0, d_1, d_2, . . . , d_(N−1) into the circular buffer of length $N_{IR}$, and the LBRM comprises:

i) puncturing $(N-N_{IR})$ coded bits among the coded bits d_0, d_1, d_2, . . . , d_(N−1) based on K/E being smaller than or equal to R; and ii) shortening $(N-N_{IR})$ coded bits among the coded bits d_0, d_1, d_2, . . . , d_(N−1) based on K/E being greater than R, where R is a predetermined value, wherein puncturing the $(N-N_{IR})$ coded bits comprises excluding first $(N-N_{IR})$ coded bits among the coded bits d_0, d_1, d_2, . . . , d_(N−1), and wherein shortening the $(N-N_{IR})$ coded bits comprises excluding last $(N-N_{IR})$ coded bits among the coded bits d_0, d_1, d_2, . . . , d_(N−1).

* * * * *